June 27, 1967     M. BERGER ET AL     3,328,110
ELECTROMAGNETIC RADIATION VALVE

Filed Jan. 2, 1964     16 Sheets-Sheet 1

THOMAS A. MANUEL    Inventors
MARTIN BERGER

By David A. Roth

Patent Attorney

June 27, 1967 M. BERGER ETAL 3,328,110
ELECTROMAGNETIC RADIATION VALVE
Filed Jan. 2, 1964 16 Sheets-Sheet 1

MARTIN BERGER
THOMAS A. MANUEL                    Inventors

By *David A. Roth*

Patent Attorney

June 27, 1967 M. BERGER ET AL 3,328,110
ELECTROMAGNETIC RADIATION VALVE
Filed Jan. 2, 1964 16 Sheets-Sheet 3

MARTIN BERGER
THOMAS A. MANUEL   INVENTORS

BY David A. Roth

PATENT ATTORNEY

June 27, 1967 M. BERGER ET AL 3,328,110
ELECTROMAGNETIC RADIATION VALVE
Filed Jan. 2, 1964 16 Sheets-Sheet 4

MARTIN BERGER
THOMAS A. MANUEL   INVENTORS

BY David A. Roth

PATENT ATTORNEY

FIGURE 7
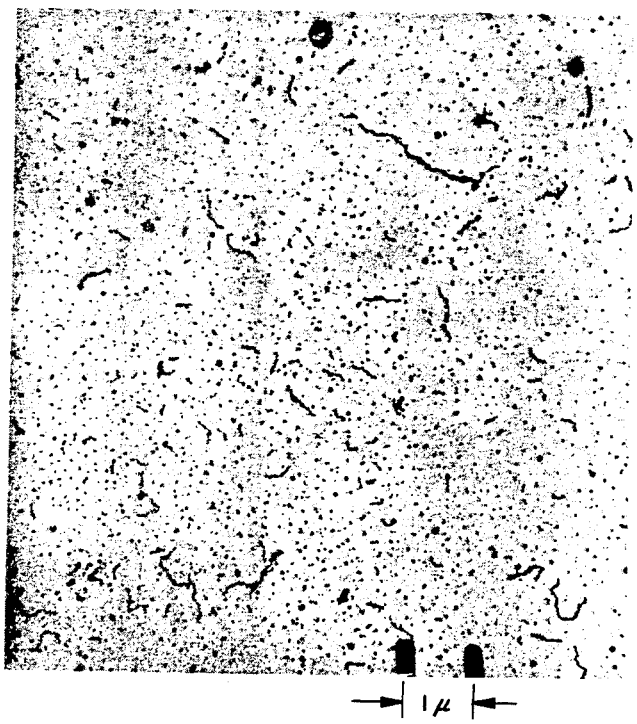
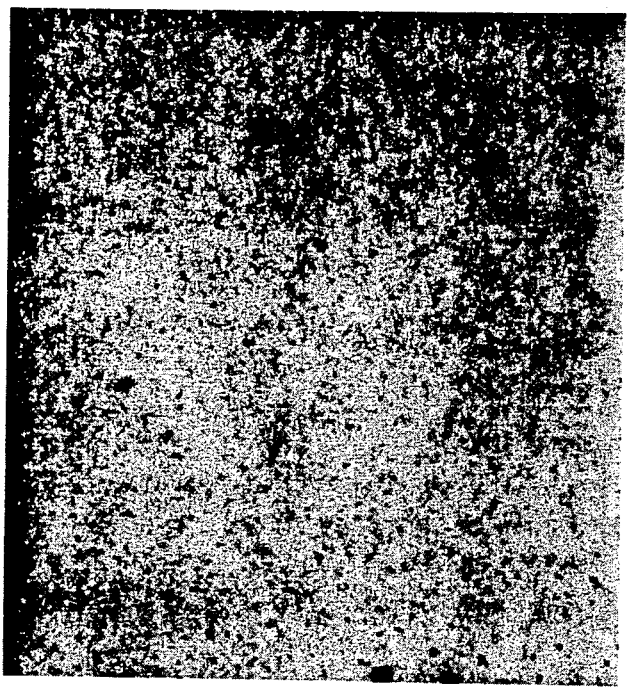
FIGURE 14
"A" COMPOSITION
Martin Berger
Thomas A. Manuel  INVENTORS

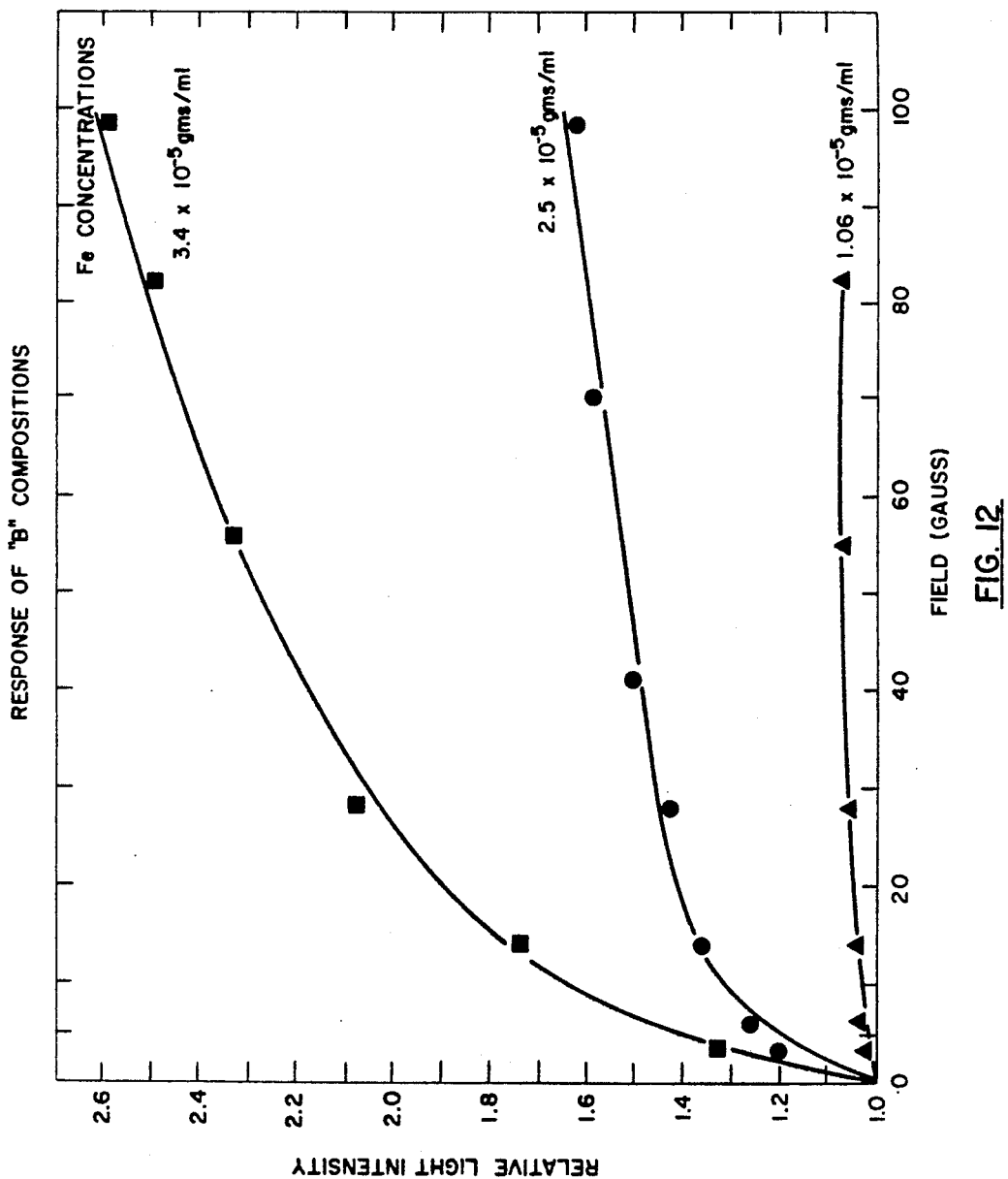

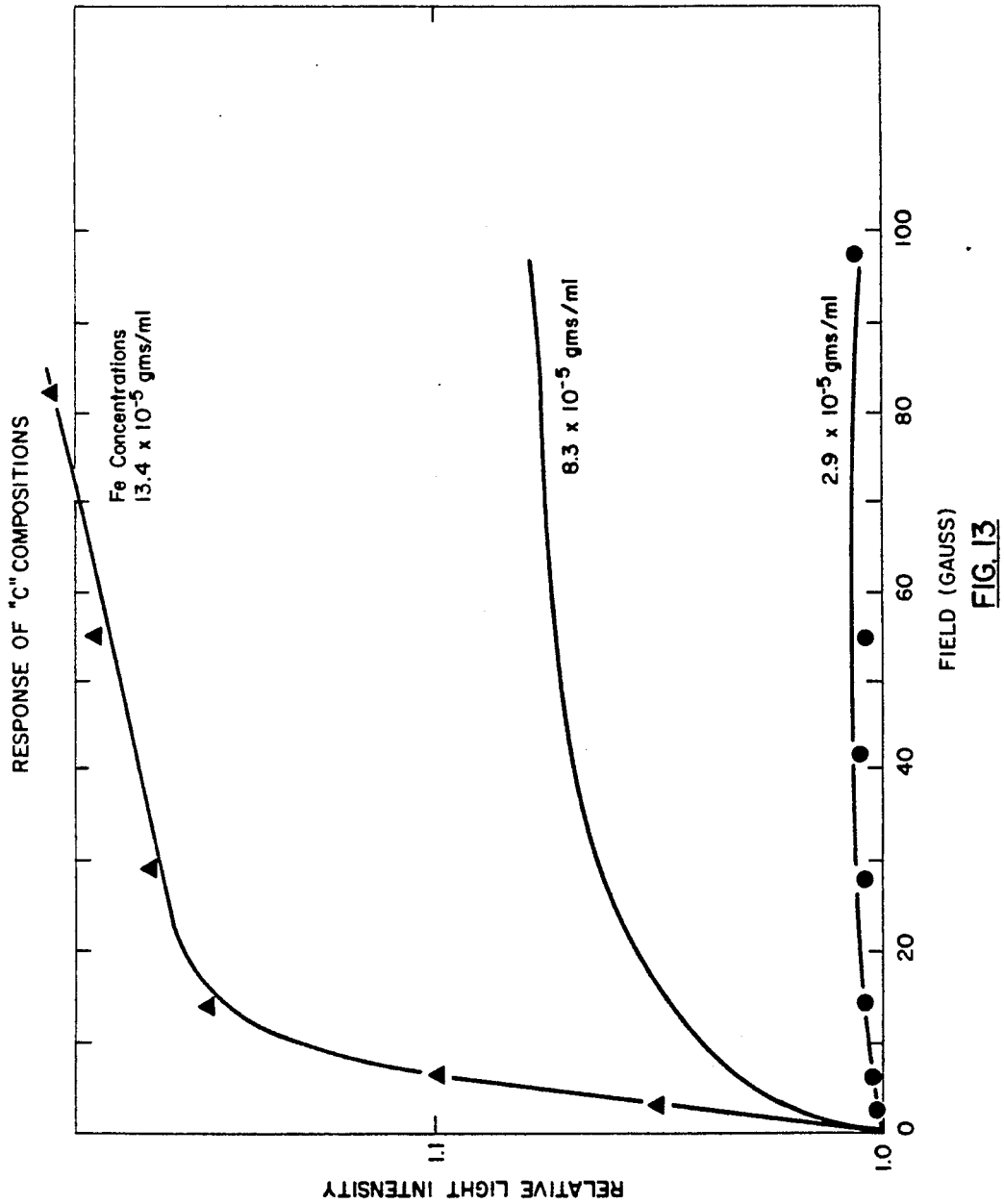

June 27, 1967 M. BERGER ET AL 3,328,110
ELECTROMAGNETIC RADIATION VALVE
Filed Jan. 2, 1964 16 Sheets-Sheet 12

"C" COMPOSITIONS

"B" COMPOSITIONS

Martin Berger
Thomas A. Manuel  INVENTORS

BY

PATENT ATTORNEY

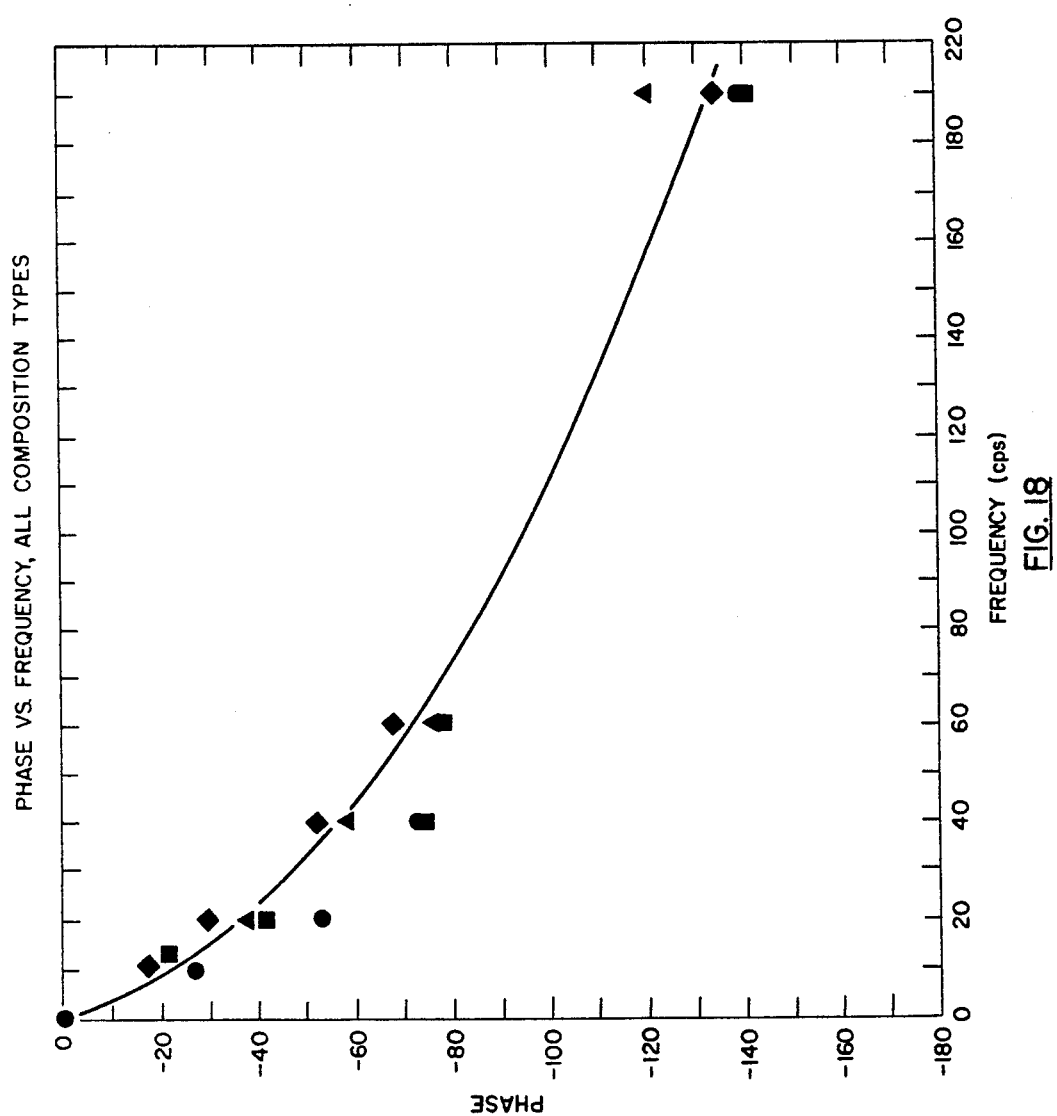

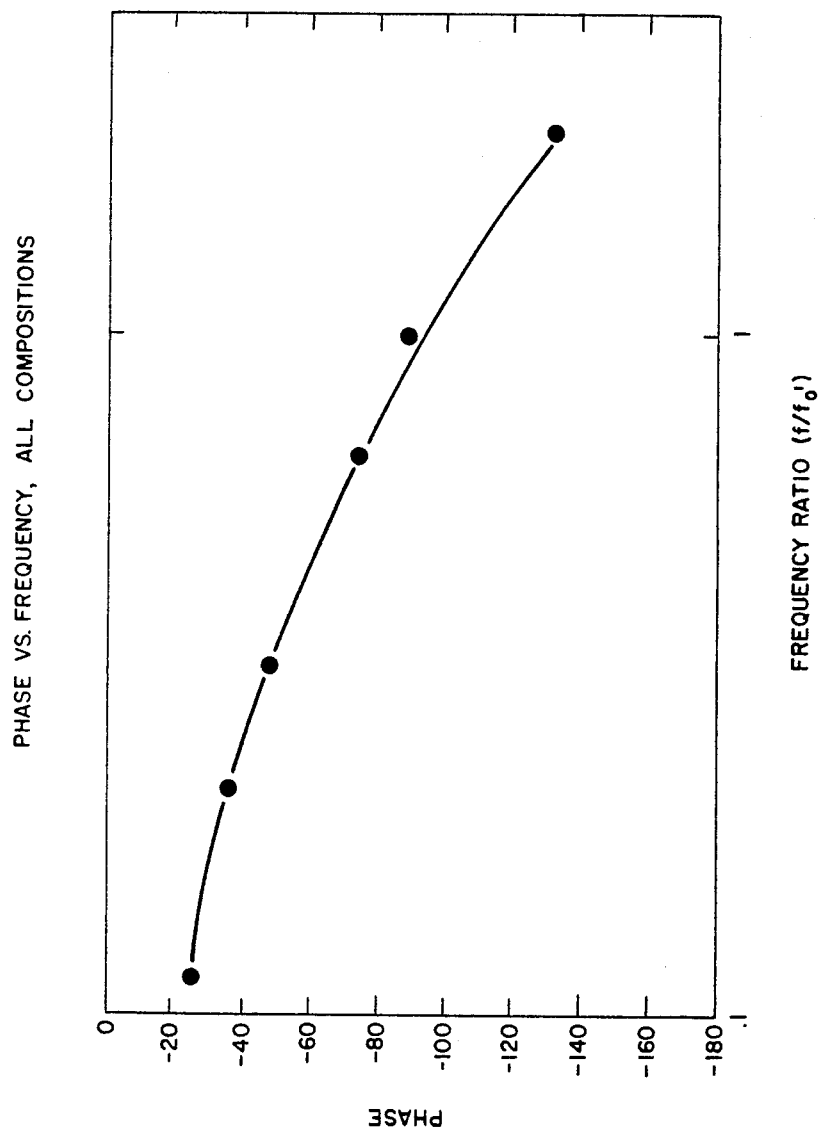

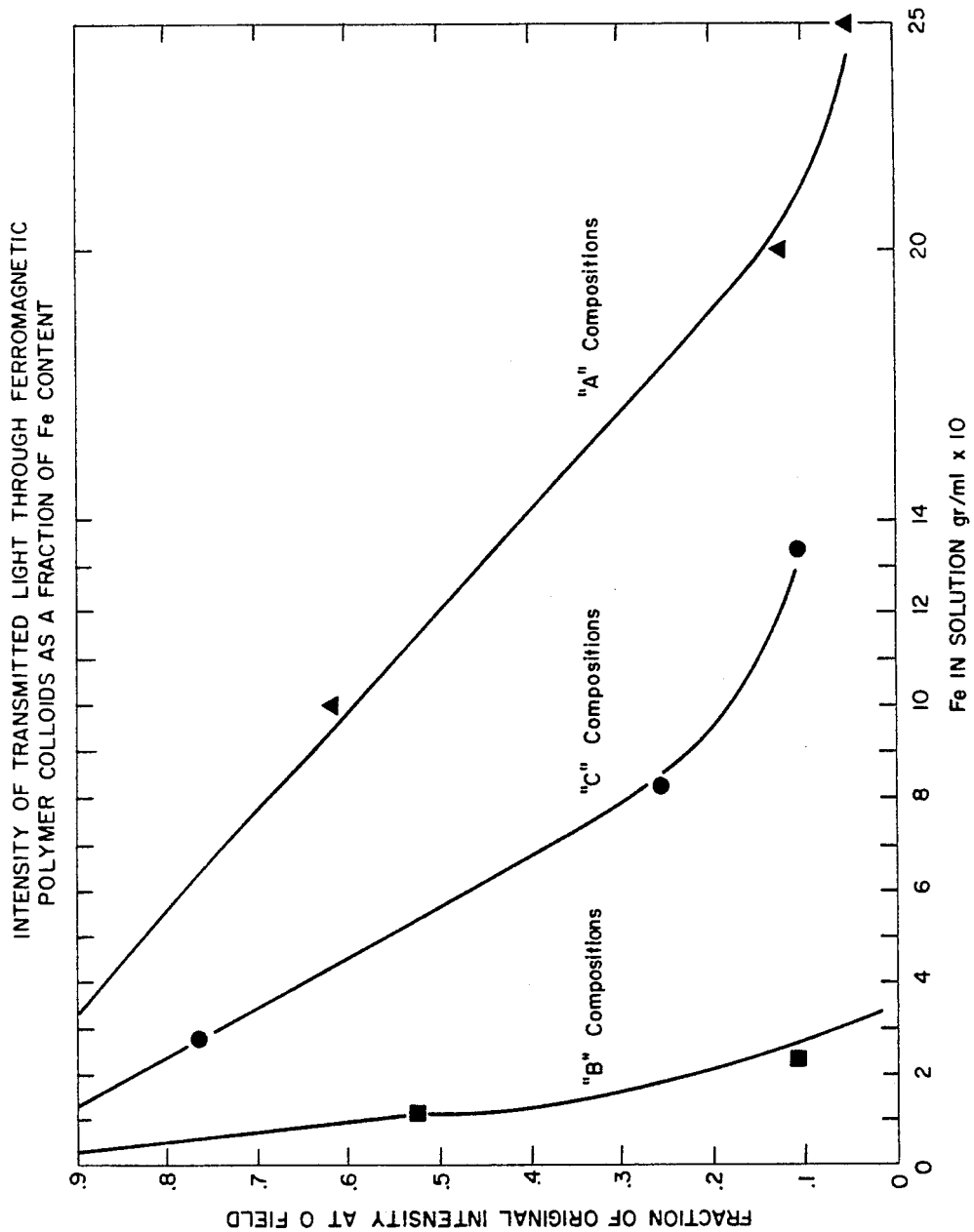

United States Patent Office 3,328,110
Patented June 27, 1967

3,328,110
ELECTROMAGNETIC RADIATION VALVE
Martin Berger, East Brunswick, and Thomas A. Manuel, Westfield, N.J., assignors to Esso Research and Engineering Company, a corporation of Delaware
Filed Jan. 2, 1964, Ser. No. 336,339
11 Claims. (Cl. 350—160)

This application is a continuation-in-part of S.N. 332,302 filed Dec. 20, 1963, now U.S. Patent 3,278,441; which in turn is a continuation-in-part of S.N. 201,260, filed June 11, 1962, now abandoned; which in turn is a continuation-in-part of S.N. 176,131, filed Feb. 27, 1962, now abandoned. The above applications are all commonly assigned. This application relates to an apparatus having the ability to transmit varying quantities of electromagnetic rediation in accordance with externally applied electrical quantities such as voltage, current, electric field, electron beam, and the like, which are converted into a magnetic field. This apparatus is referred to as an electromagnetic radiation valve.

In particular, the invention relates to a light valve apparatus which can regulate light transmission and methods and techniques for using said electromagnetic radiation valve and its special version which is a light valve.

The invention resides in the discovery that a dilute, colloidal solution of a ferromagnetic material in a solvent can be used to vary the transmission of electromagnetic radiation, such as light, by impressing a variable, magnetic field on the dilute, colloidal solution. One practical utilization of this invention is in the transmission of information over light beams. In particular ferromagnetic polymers can be used in colloidal solution as an element of the apparatus of the invention.

The chainlike structure of these ferromagnetic polymers affects light in a manner which cannot be reconciliated with the usual thories concerning the interaction of colloidal particles with light. In an appropriate solvent, the chainlike structure (see FIGURE 7) probably exists as a coil. In the presence of a magnetic field, however, the coil is distorted or "oriented." Depending on this orientation and the direction of the electric vector of the light wave, the transmission of light through the liquid is either enhanced, attenuated or, in a special case, not changed at all. At first glance this would appear to be a scattering phenomenon. However, scattering would demand a strong dependence of this effect on the wave length of light. No such effect has been found. The interaction of the metal polymer and light is not affected by the wave length of the light. In general, the size of the metal polymer particle is much too small for a pure geometric mechanism (such as a "venetian blind effect"). Thus it is not possible to say now just what the pertinent mechanism is.

One of the most significant features of the instant invention is the phenomenon that the transmission of light in the valve can be influenced quite markedly by the presence of very weak magnetic fields. For instance, colloidal solutions containing $3.4 \times 10^{-5}$ grams of iron per cc. of solution, having an average particle size of approximately 0.1 micron held in suspension in carbon tetrachloride show characteristics which are summarized in the following Table I.

TABLE I

| Magnetic field (in direction of light): | Light intensity (arbitrary units) |
|---|---|
| 0 | 1 |
| 1 oersted | 1.12 |
| 2 oersteds | 1.22 |
| 3 oersteds | 1.33 |

These are very weak magnetic fields. For instance a horseshoe magnet bought in a dime store with a length of about 3 inches at the center portion would have a magnetic field of about 10 to 20 oersteds.

The invention can be fully understood with the description herein, the claims, and the following drawings wherein:

FIGURE 7 is a photomicrograph of a typical iron polymer showing chains and particles.

FIGURES 8 to 13 and 17 to 20 are various plots of data obtained in some of the examples.

FIGURES 14 to 16 are various enlarged photomicrographs of various solutions of ferromagnetic polymers and solvents which were used in the examples in the specific embodiments of the invention.

Figure 1:
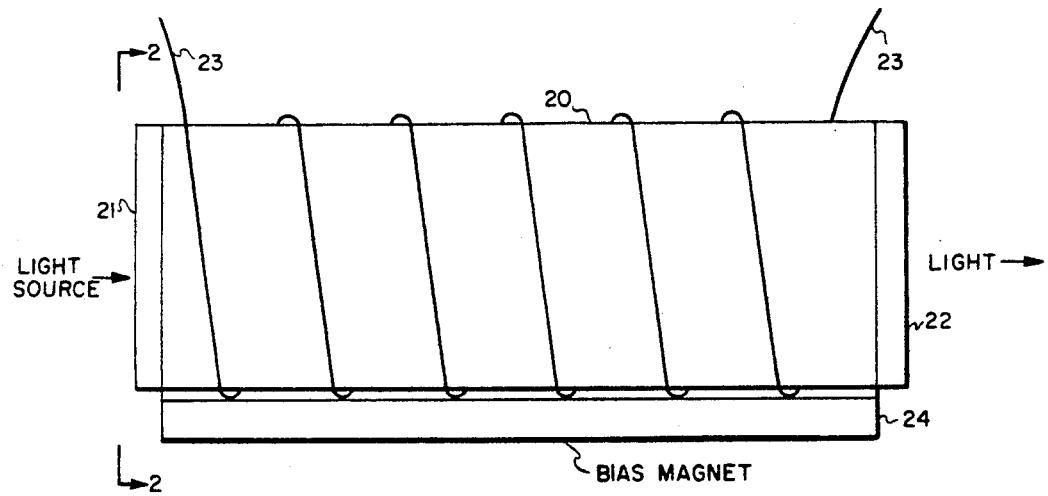
FIGURE 1 is a side view of an electromagnetic valve of the invention suitable for use with white light.

FIGURE 1 is now referred to. It is a cylindrically shaped cell 20, watertight, having sidewalls of nonpermeable material, nonpermeable to magnetic flux, and having end portions 21 and 22 made of glass. The inner portion of cell 20 is filled with the colloidal solution of the ferromagnetic material, said colloidal solution having the ability to transmit electromagnetic radiations.

Solenoid 23 is coiled around cell 20; bias magnet 24 is attached to cell 20 in such a manner that its magnetic field is parallel to the direction of light from the light source.

It has been found that a biasing magnetic field is necessary in voice communication with two reasons. Without a bias magnet the variation of light intensity does not follow the variation of the coil magnetic field. The second reason is that a biasing magnet amplifies the light variation over what it would be without a bias. Generally speaking, the magnetic strength of the biasing field should be approximately the same as that of the exciting field. The relationship between the direction of the biasing field to that of the exciting field and the direction of the light beam is quite complicated. The optimum situation found thus far is with the biasing field perpendicular to the exciting field and both fields at 45° to the light beam. In effect the fields make an X across the path of the electromagnetic energy, i.e. light.

Figure 2:
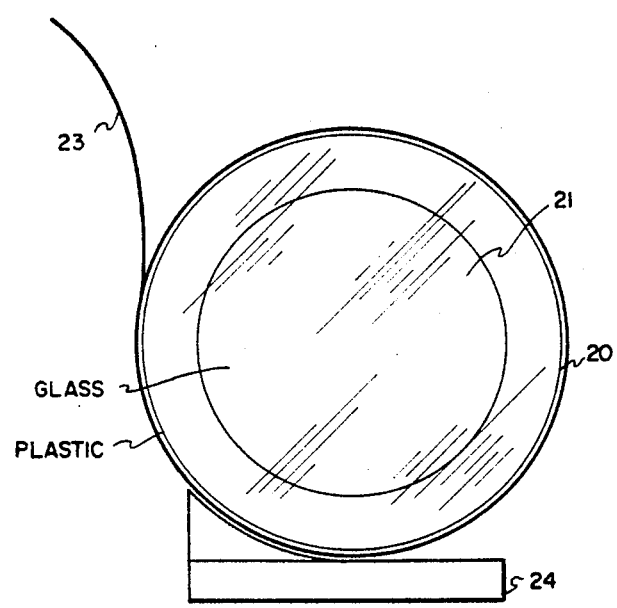
FIGURE 2 is a cut taken along line 2 to 2 in the FIGURE 1 electromagnetic radiation valve.

FIGURE 2 is a side view taken along the line 2—2 of the FIGURE 1 cell 20. It shows the cylindrical wall construction as being a material impervious to light and the ends of the cell as being glass lenses 21 and 22.

Figure 4:
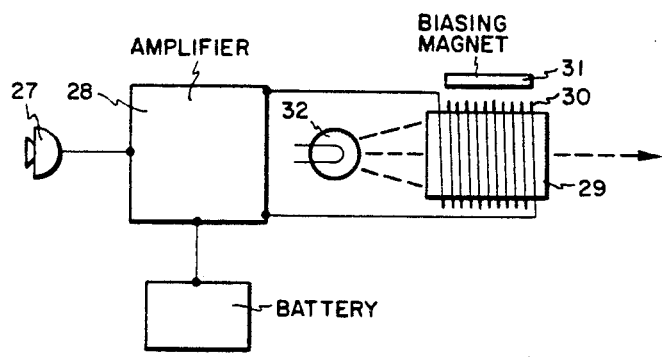
FIGURE 4 is a schematic of the transmitting portion of a portable audio-optical communication apparatus illustrating a specific embodiment of a practical utility for the electro mechanical radiation valve of the invention, as well as illustrating an inventive system for transmitting and receiving signals particularly voice signals.
Figure 5:
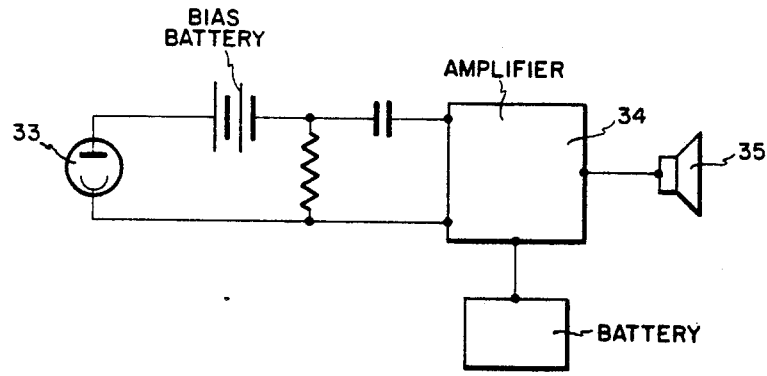
FIGURE 5 is a schematic of the receiving portion of a portable audio-optical communication apparatus and illustrating the embodiment touched upon above for FIGURE 4.

Turning now to FIGURES 4 and 5, a schematic of a specific apparatus for audio communication is shown. This apparatus has two subassemblies; one is a transmitting subassembly shown in FIGURE 4 and the other is a receiver subassembly shown in FIGURE 5.

The subassembly of FIGURE 4 comprises in combination a microphone 27, a power amplifier 28, and cell 29 containing ferromagnetic colloid. Coil 30 is around cell 29 with its leads connected to amplifier 28. Biasing magnet 31 is positioned with respect to cell 29 so that its field is parallel to the direction of light. Light source 32 supplies electromagnetic radiation which is to be passed through cell 30. In practice the light can be an ordinary flashlight.

The subassembly of FIGURE 5 comprises in combination a photoelectric cell 33, electronic circuit means connecting cell 33 with power amplifier 34, which is connected to speaker 35. The resistor in the schematic is the normal load resistor for a photo cell. Preferably photoelectric cell 33 is mounted in the focus point of a parabolic reflector. The power amplifiers 28 and 34 for both sub-assemblies are flash-light battery operated.

Using colloidal solutions of ferromagnetic polymers, which are described later herein, the above circuits will preferably operate within about 10 c.p.s. to about 10,000 c.p.s.

One of the outstanding advantages of the ferromagnetic colloidal solution of the invention in this use is the low field requirements of the coil. These are in the order of 10 to 20 oersteds. Thus, the unit can be battery operated, in addition the circuits can be a low impedance type and, therefore, transistorized.

Since the nature of the mechanism is in doubt, one cannot make a prediction as to the frequency limitations of this device. However, it is found that the geometries of the field do influence the frequency response. One method of extending the frequency response is by means of crossed magnetic field, that is, one field in the direction of the light beam and the other field parallel to the light beam. These fields should be 90° out of phase. This would cause a larger amplitude at a given frequency for the same current. However, as in the case of the single field, some sort of magnetic biasing would be necessary to avoid second harmonics. Depending on the nature of the response, biasing at a selected angle to a light beam can be accomplished and biasing electrically through the coil can also be carried out.

The use of this communication apparatus will be highly desirable in situations where communications must not be picked up or jammed by unwanted parties. The apparatus can be used, for instance, in ship-to-ship, plane-to-plane, tank-to-tank or man-to-man communications. It offers particular advantages in military communications.

Figure 3:
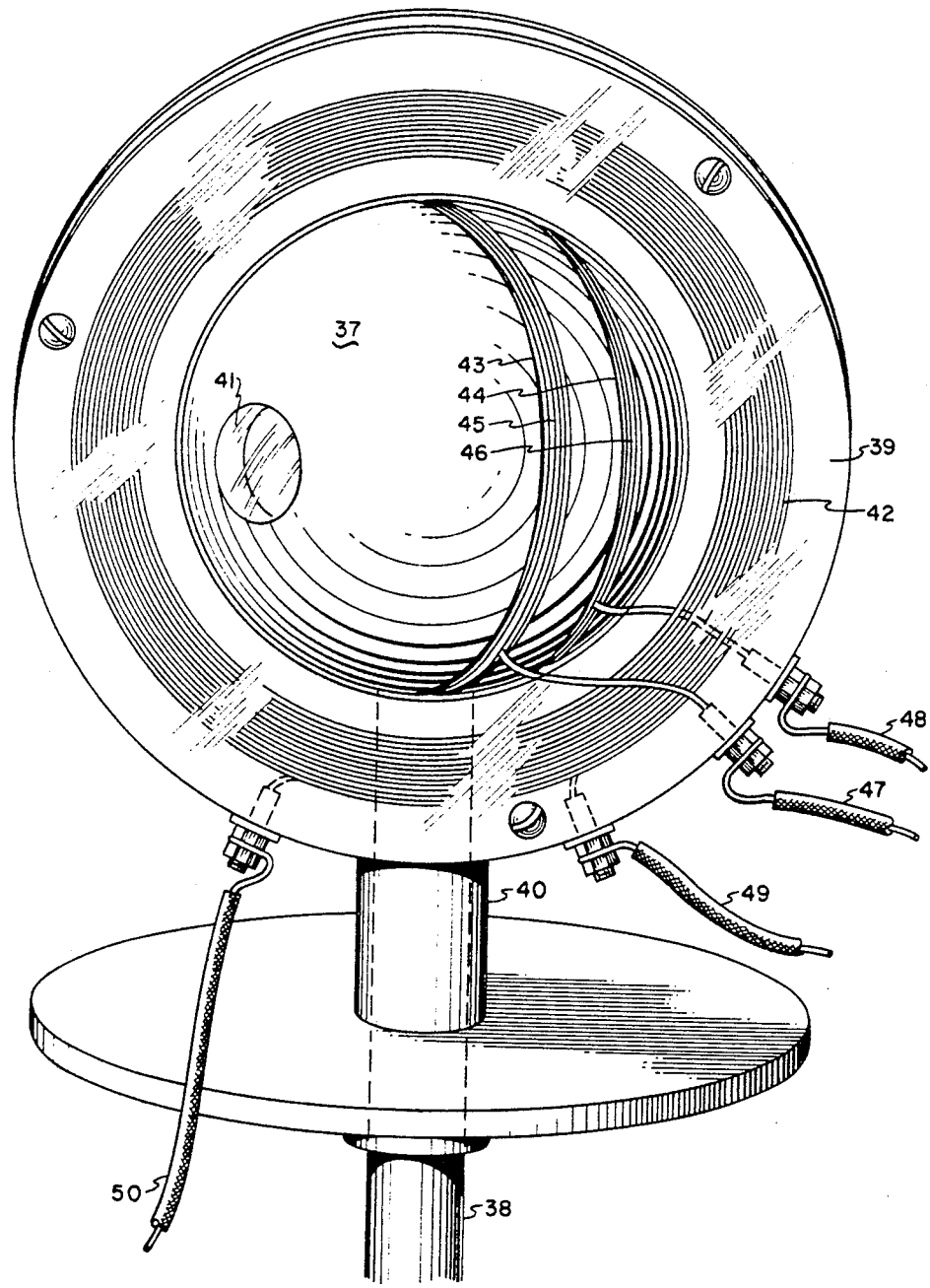
FIGURE 3 is a view of a preferred embodiment of an electromagnetic valve with variable bias means.

FIGURE 3 is a perspective view of an embodiment of a precision light valve apparatus having variable magnetic biasing means which was used in the laboratory to obtain the data in the examples. Naturally for portable field operations light valves similar to those of FIGURES 1 and 2 would be more practical. In FIGURE 3, sphere 37 is rigidly mounted on upright shaft 38. Completely surrounding sphere 37 is a circular collar 39 having a downwardly projecting tubular sleeve 40 which is rotatably mounted on shaft 38. Collar 39 can be freely rotated around sphere 37. The inner portion of collar 39 preferably makes contact with sphere 37, but such contact is not sufficient to interfere with the rotation of collar 39.

In this embodiment, sphere 37 is a plastic billiard ball although it will be understood that equivalent spherical means can be used. The inside of sphere 37 is hollowed out to form a cavity for the magnetic fluid. The outsides of sphere 37 are provided with windows. Window 41 is shown. The other window is exactly opposite so that a horizontal beam of light can pass completely through sphere 37 by means of the windows. At the top of sphere 37 there is an opening through which a transparent cell containing the magnetic fluid can be introduced within sphere 37. The magnetic fluid occupies a portion of sphere 37 between the windows so that light passing through the windows must also pass through the magnetic fluid.

Collar 39 has a double flange on its outer periphery within which is wound a conductive wire to form coil 42. Current passing through coil 42 creates a magnetic field which is the biasing magnetic field. By changing the position of collar 39 the direction of the magnetic bias relative to the light path through sphere 37 can be adjusted to any desired angle.

In the center portion of sphere 37, two circumferential grooves, 43 and 44, are cut. The grooves describe circles; the path of light through the center of sphere 37 passes through the center axis of these circles. Conductive wire is wound around grooves 43 and 44 to form coils 45 and 46. The leads of the conductive wire from coils 45 and 46 are bound in insulated cables 47 and 48 and are connected to any source of an alternating waveform such as a sinusoidal waveform. The leads of the conductive wire from coil 42 exit from collar 39 through insulated cables 49 and 50 which can then be connected to a source of electromotive force.

The preparation of the magnetic polymers which are used as in the magnetic solutions for the electromagnetic valve of the invention is described fully in U.S. Patent 3,278,441. The disclosure of said application is incorporated herein by reference. However, so much of the disclosure of said application will be repeated here as necessary to eliminate the necessity for constant referral to said U.S. Patent 3,278,441.

The invention of said U.S. Patent 3,278,441 relates to the discovery that by using an excess of the metal carbonyl in the metal polymer preparation and by extending the duration of the treatment past the time required to secure metal complex formation, magnetic polymers can be obtained directly. It is believed that particles of the pure metal are attached to and grow from the metal carbonyl group located at the double bond. Furthermore, it has been additionally discovered that magnetic fluids having superior magnetic properties are obtained when the preparation of the magnetic fluid is carried out in the presence of a magnetic field greater than that of the earth. The field can be quite small. For instance, that exerted by a commercial laboratory magnetic stirring bar has been found to be sufficinet.

In S.N. 201,260, now abandoned, the basic polymeric complex unit in the polymer was shown to be represented by the general formula

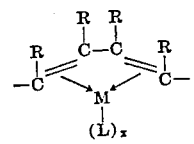

wherein M is a polyvalent heavy metal, particularly a transition metal such as iron, cobalt and nickel; R comprises a substituent group like hydrogen and hydrocarbons, particularly $C_1$ to $C_3$ alkyl groups and combinations thereof; L is electron donating ligand groups bonded directly to the metal atom such as carbonyls, hydrogen, hydrocarbons, and other ligand groups subsequently discussed; $x$ represents the number of ligand groups and, depending upon the metal and the number of electrons shared by the ligand groups with the metal, can be a number from 1, to 4, such as 1, 2, 3, or 4, usually 3.

The unsatisfied valence bonds of the polymeric complex unit $-R_4C_4ML_x-$ are satisfied by one or more of either other polymeric complex units as described, or by other ethylenically unsaturated or saturated hydrocarbon groups within the main or side chain, such as

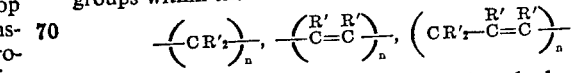

and the like wherein R' is a radical such as hydrogen and hydrocarbon radicals such as alkyl, aryl, alkyaryl, olefinic, cyclodiene radicals and $n$ is a number from 1 to 10, e.g., 2 to 8. Suitable examples include methylene, vinylene and vinylidene radicals. The complex unit can be interspersed within the other groups of the polymer in any combination such as in isolated, cumulative or conjugate positions. Of course, the ends of the polymer main or side chain and also the complex unit where this unit is on the end of the chain are terminated with the usual terminal end groups such as $CR'_3$—, $CR'_2$=$CR'$— and hydrogen. The exact amount and nature of the complex unit distribution within the polymers depends on the type of polymer, the degree of ethylenical unsaturation before and after the reaction, and other factors within the selection or control of the formulator skilled in the art.

In S.N. 201,260, now abandoned, it was disclosed that in the reaction between the polymer and the metal carbonyl compound, the isolated ethylenically unsaturated bonds are transposed to conjugate positions. For example, in the reaction between polybutadiene and iron carbonyl, the pair of remaining ethylenical bonds in two polymerized monomers is conjugated with the resulting structural formula of $$-CH_2-CH=CH-CH=CH-CH_2-CH_2-CH_2-$$

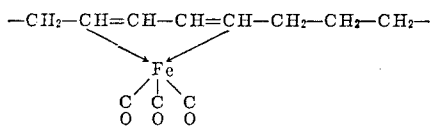

with the unsatisfied valences satisfied as before by the remaining portion of the polybutadiene structure such as by $C_4H_6$ groups or multiples thereof or by terminal groups such as $C_4H_7$ groups. The polybutadiene complex unit was also generally represented in S.N. 201,260, now abandoned, as

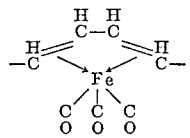

The method of said U.S. Patent 3,278,441 gives particles which, together with polymer, are associated into chains, which may range up to four or five microns in length, or even longer. This phenomenon is possible only when the polymer contains complexed metal carbonyl groups. It is believed that the metal particles are held to the polymer chain through these groups. Iron carbonyl is the preferred carbonyl reactant. The basic polymeric complex unit in the polymers of the instant invention are represented by the formula

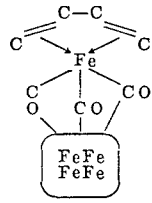

It can be seen that several additional Fe molecules form in a cluster on the internal iron carbonyl group. This is referred to herein as "clumping." The iron molecules are said to form "clumps." In the presence of a magnetic field, the iron particles and their associated polymer are formed into the chains observed. The presence of the chains imparts unusual magnetic properties. It is well known that elongated fine particles have superior magnetic properties (I. S. Jacobs and C. P. Bean, Physical Review, 100, 1060 (1955)). The chains of the invention are in effect such materials. Although the preferred compositions of the invention are the magnetic polymers having "clumps" of a metal, it will be understood that novel polymers having "clumps" of a metal can be prepared by omitting the magnetic field in their preparation. These polymers have a smaller degree of permanent magnetic character than do those prepared in the presence of a magnetic field and have utility as normal polymers where a large percent of metal content is desirable.

The magnetic liquids and solids of U.S. Patent 3,278,441 can be prepared directly or from the metal carbonyl complexes of S.N. 201,260, now abandoned. It will be understood that, if prepared directly, the reaction will proceed via the reaction for the metal carbonyl complexes which is set forth in S.N. 201,260, now abandoned.

Generally, a solution of the metal complexed polymer in a solvent is heated at temperatures of from 100° to 300° C. for 12 to 120 hours in an inert atmosphere in the presence of excess metal carbonyl of the same or different metal as the carbonyl used to form the complex and in the presence of a magnetic field. The metal carbonyl can be added all at once or divided in several portions and added at intervals of several hours over the reaction time period. The resultant liquid contains a solution of the polymer and highly dispersed metal which is nonseparable under a strong magnetic field.

The solid iron-containing polymers can be separated from the solvent and excess carbonyl by simple vacuum distillation at room temperature which removes both solvent and excess carbonyl. The resulting solid polymers generally have iron contents ranging from 30 to 75 wt. percent of the total solid, although polymers containing a lesser amount of iron can be prepared.

The reaction conditions, solvents, reactants and the like set forth in S.N. 201,260, now abandoned, are, therefore, generally applicable and are set forth as follows. Polymers containing the best magnetic properties are those prepared with an excess of the carbonyl in the presence of a small magnetic field. Only the normal heating for the reaction is necessary. The magnetic field should be greater than that exerted by the earth and preferably from 2 to 10,000, more preferably 10 to 1,000 and most preferably 50 to 500 oersteds or more. The magnetic field can be either stationary or moving. Moreover, the magnetic field need not be applied continuously during the reaction. It can be applied at any time during the reaction for a time period less than the reaction time. The preferable time of application is toward the end of the reaction. It can also be applied during the entire reaction period without detriment.

The metal carbonyl polymer complexes of S.N. 201,260, now abandoned, are prepared by contacting the ethylenically unsaturated polymer either in bulk or in solution with the desired metal carbonyl compound in a nonoxidizing atmosphere or under nonoxidizing conditions. The quantity of the metal carbonyl to be employed depends in part upon the degree of unsaturation of the polymer and the desired amount of metal to be complexed with the polymer together with the desired characteristics and the proposed utility of the complexed polymers produced. The maximum quantity of metal carbonyl that can be complexed with the polymer can be determined stoichiometrically by the degree of polymer unsaturation, since each pair of carbon-to-carbon ethylenically unsaturated bonds is capable of complexing one mole of metal. Of course, the reaction can be carried out in situ during the polymerization, copolymerization or the dehydrogenation of a polymer or its monomers; and the reaction can be carried out with less than stoichiometric quantity of the metal carbonyl, where a high metal content is undesirable or not required. Regardless of the quantity of metal carbonyl employed, subsequent vulcanization or curing of the metal carbonyl complexed polymer can be accomplished, whether there exist complex, conjugated, unsaturated bonds or free, unsaturated bonds in the polymer.

In S.N. 201,260, now abandoned, it was disclosed that concentration of the metal carbonyl should generally exceed 10 wt. percent or catalytic quantities since these lower amounts are normally ineffective to form sufficient metal complexed polymer for most requirements. Of course, the exact concentration of the metal carbonyl will vary, subject to selection but the preferred amount of metal carbonyl for the present invention based on the weight of the monomeric polymer unit or copolymer unit in the polymer should be a major amount of 50 weight percent or more, with from 100 to 800, e.g., 150 to 500, weight percent or even higher concentrations often required in the reaction. The weight percent of metal carbonyl used will depend on the degree of unsaturation of the polymer and the molecular weight of the polymer. These concentration limits for the complex of S.N. 201,260, now abandoned, may be generally expressed as at least 0.15 or from 0.25 to 2.50, e.g., 0.40 to 1.5, moles of metal carbonyl per mole of ethylenical unsaturation in the polymer for preparation of the complex of S.N. 201,260, now abandoned. The quantity of the metal carbonyl and metal complexed with the polymer is usually determined by analysis of the infrared spectra of polymer samples or by conventional combustion analysis methods. For preparation of the magnetic materials of U.S. Patent 3,278,441 which are useful in the valve of the invention the carbonyl is used in large excess. For instance, from 10 to 200, preferably 40 to 150, and most preferably about 85 to 115 parts by weight of metal carbonyl per part of polymer can be used.

These concentrations for the reaction can be expressed as 2 to 55, preferably 2.51 to 55, more preferably 11 to 41, and most preferably 23 to 32 moles of metal carbonyl per mole of ethylenic unsaturation. This is a total amount and, if the intermediate product, i.e., the complex of S.N. 201,260 has already been prepared, then the amount of metal carbonyl found in the complex should be taken into account. It is almost a negligible amount compared to the excess carbonyl that must be reacted with it to form the "clump" type polymers.

In general, the reaction between the metal carbonyl and the polymer to form the complex polymer or between the metal carbonyl and the complex polymer proceeds over a wide range of temperatures, preferably 30° to 150° C., but efficient reaction rates require elevated temperatures of over 70° C. with temperatures of 80° to 130° C., generally preferred. For ion carbonyl, the temperature is preferably from about 100° to 150° C. For cobalt carbonyl or nickel carbonyl, temperatures of 20° C. to 90° C. are satisfactory.

The reaction at lower temperatures proceeds without significant degradation in the molecular weight of the polymer. But as the reaction temperature increases, the depolymerization of the polymer increases.

The reaction may be carried out at elevated temperatures with the polymer in bulk or in solution, e.g., in hydrocarbon solvents, where degradation of the polymer is of insignificant importance. Where maintenance of the polymer molecular weight is desired, the reaction is preferably carried out in solvent solutions of, or containing, polar protective solvents.

The time for the completion of the complexing reaction depends upon the reaction temperature selected, the metal carbonyl employed, the amounts of reactants and other preselected reaction conditions. The time may vary from one hour to 72 hours, e.g., 2 to 24 hours. However, at the preferred elevated temperatures of above 70° C., the reaction normally is complete in 2 to 6 hours. For the magnetic polymer reaction the time is from 15 to 120 hours, preferably 24 to 96, and most preferably about 60 to 80 hours.

It will be noted that the ranges for time and quantity of carbonyl for the complex polymer and the magnetic polymer overlap to some extent. However, at the said temperatures of preparation, the time of formation of the complex polymers is orders of magnitude less than the time required for the "clumped" strongly magnetic and mildly magnetic polymers of this invention. The overlap of the carbonyl reactant is only in the 2 to 2.5 moles of carbonyl per mole of ethylenic unsaturation in the polymer.

To prevent polymerization and gellation of the polymer during the reaction, a nonoxidizing atmosphere and condition is maintained in the reaction vessel. Gellation is usually prevented by employing a blanket of an inert gas such as nitrogen, helium, carbon monoxide, rare gases, and the like over the polymer after the reaction zone or vessel has been swept clear of air or oxidizing compounds and gases. The reaction proceeds at atmospheric pressures but pressures of from 0.1 to 10 atmospheres or higher or lower may optionally be used.

In one embodiment of the invention, a protective polar organic solvent is employed either alone or with a hydrocarbon polymer solvent to protect the polymer from molecular weight degradation at elevated temperatures. In this manner, rapid reaction rates without significant molecular weight degradation can be obtained. Any polar solvent having more polarity than a hydrocarbon, such as heptane, and other than an acid, acid anhydride or acid chloride, may be employed with those saturated organic solvents containing carbon, hydrogen and oxygen or containing one or more keto, ether, or hydroxyl groups being preferred protective solvents.

It has been found that, in general, the presence or absence of the polar protective solvent determines the relative coercivity of the resulting magnetic polymer. Thus, omission of the polar protective solvent generally results in polymers with a relatively low value of magnetic coercivity while the presence of the polar protective solvent generally results in magnetic polymers having a relatively high degree of coercivity. For some unknown reason, there are from time to time exceptions to the above general discussion on coercivity. Thus some magnetic polymers prepared in the absence of polar solvents but having high coercivity values have been obtained.

The term "coercivity" as used herein refers approximately to the degree of residual magnetism of the magnetic polymers. High coercivity denotes a relatively high degree of residual magnetism after a magnetic field has been removed. Low coercivity denotes a low degree of residual magnetism after a magnetic field has been removed. There are many uses where low coercivity is desired and, conversely, there are many other uses where high coercivity is equally desirable.

The protective solvent employed should be wholly, or partially miscible with the unsaturated polymer or the polymer solution and may, in certain cases, function as both the polymer solvent and the protective solvent, such as in the case of ethers like 1,3-dialkoxy alkanes such as 1,3-dimethoxy ethane. Dioxane (1,4-diethylene dioxide) is a particular preferred protective solvent.

The protective solvent when employed in combination with a hydrocarbon solvent normally comprises from 1 to 30 volume percent of the solution, e.g. 1 to 10 volume percent. Suitable nonlimiting examples of polar solvents include those substituted and unsubstituted, saturated and unsaturated, $C_1$ to $C_{30}$ aliphatic, alicyclic, aromatic, heterocyclic and alkyl-aromatic solvents such as cyclohexanol; alkanols like methanol, ethanol, tert butanol; alkyl aromatic alcohols like benzyl alcohol; glycols like propylene glycol, hexylene glycol; ketones like acetate, cyclohexanone; ethers like alkyl and aromatic ethers such as ethyl ether, phenyl ether; aldehydes like benzaldehyde, acetaldehyde; esters like carboxylic esters such as benzyl acetate, tert butyl acetate and the like, and mixtures and combinations thereof.

The process of preparing the intermediate polymeric complexes of S.N. 201,260 and metal-containing polymers of the invention of U.S. Patent 3,278,441 may be aided, if desired, by the employment of high energy and actinic sources to wholly or partially replace the use of heat. Thus, gamma irradiation or ultraviolet irradiation may be used alone or in combination to effect the reaction of the metal carbonyl and the polymer. Further, the metal carbonyl, besides being added directly to the polymer as a liquid or solid, can be employed in the gaseous form either as a gas or sublimate vapor. In this situation, any liquid-gas or solid-gas contacting means can be employed such as a sparger beneath the surface of the polymer solution, or column contacting means whereby a stream of metal carbonyl gases is employed in a current or countercurrent direction to the polymer or polymer-containing solution.

A preferred embodiment of the invention comprises adding the unsaturated polymer to a solution comprising a hydrocarbon solvent, and in some instances, a polar solvent and, optionally, other conventional additives, sweeping the reaction vessel with nitrogen to remove air, adding the metal carbonyl to the polymer solution, heating the solution to 70° C. to 130° C. while subjecting it to a magnetic field of 10 or more oersteds for about 72 hours. The resulting magnetic liquid can be used as is or a magnetic polymer can be recovered by precipitating the polymer in a polar precipitation nonsolvent for the polymers, such as an alcohol, ketone and the like, for example, an aliphatic alcohol.

The starting polymers employed for the alternate production of magnetic fluids are those homo or copolymers containing some degree of carbon-to-carbon ethylenical unsaturation. The unsaturation may be either in the main chain of the polymers such as present in head-to-tail polymerization methods, and as characterized by natural and synthetic elastomers like butyl rubber, or in the side chains of the polymers such as present in 1,2 polymerization as characterized by vinyl polybutadiene and 3,4 addition in polyisoprene. The ethylenically unsaturated bonds can also be present in both the main and the side polymer chains.

The degree of unsaturation of the polymers may vary between 0.5 to 99.5 mole percent such as between 0.5 and 50 mole percent, e.g., 1 to 30 or 1 to 10 mole percent, for those low unsaturated polymers and between 50 and 99 mole percent, e.g., 50 to 85 or 60 to 80 mole percent, for those highly unsaturated polymers.

The unsaturated linkages in the polymer can be conjugated, isolated, or cumulative, or any mixture or combination of these structural arrangements. The polymers prior to the complexing reaction can be partially vulcanized with conventional curing agents or copolymerized with other polymerizable monomers or polymers provided only that at the time of reaction with the metal carbonyl compound there remains some degree of carbon-to-carbon, ethylenical unsaturation within the polymer chain or molecule.

The polymers within the scope of the instant discovery may be broadly characterized as those ethylenically unsaturated polymers having an average molecular weight of from 1,000 to 3,000,000, preferably 100,000 to 800,000 most preferably 100,000 to 300,000, or higher or lower, and having Wijs iodine numbers of from 1 to 600, e.g. 1 to 50, for the low unsaturation polymers and over 100, e.g. 200 to 400, for the highly unsaturated polymers. All molecular weights are viscosity-average unless otherwise indicated.

Particularly suitable polymers and elastomers include those ethylenically unsaturated hydrocarbon rubbery polymers capable of cross linking or vulcanization and being elastic in character. Nonlimiting examples of unsaturated polymers suitable for the purposes of the invention include:

(1) Copolymers containing a major amount of an isoolefin and a minor amount of a multiolefin. These copolymers are commonly known as "butyl rubber" with their preparation and uses being described in U.S. Patent 2,356,128 to Thomas et al. This rubber normally comprises from about 85 to 99.5 weight percent of a $C_4$ to $C_8$ isoolefin such as isobutylene, or a $C_1$ to $C_3$ alkyl substituent like 2-methyl-1-butene, and from 0.5 to 15.0 weight percent of a $C_4$ to $C_{14}$ multiolefin or preferably a $C_4$ to $C_6$ multiolefin such as dimethylallyl, a cyclic diene like cyclopentadiene and cyclohexadiene, or more preferably a conjugated diene like isoprene, 1,3-butadiene, or a hydrocarbon substituted, e.g., an alkyl substituted, conjugated diene like dimethyl butadiene and the like. The rubbery reaction product of isobutylene and isoprene is particularly preferred. These butyl rubber polymers described commonly have Wijs iodine numbers of from 1 to 50 and from 0.5 to 10.0 mole percent unsaturation.

(2) Copolymers of a diene and a vinyl aromatic generally known as GR–S or SBR type rubbers commonly made by copolymerizing from 30 to 80 weight percent of a $C_4$ to $C_8$ conjugated diene such as butadiene, isoprene, or a cyclic diene such as cyclopentadiene or cyclohexadiene and a hydrocarbon substituted, e.g., an alkyl substituted, diene such as dimethyl butadiene with from 70 to 20 weight percent of a vinyl aromatic such as styrene, dimethyl styrene and alkyl substituted vinyl aromatics like divinyl benzene and the like, the preferred copolymer being that reaction product of about 70 to 80 weight percent of butadiene with about 20 to 30 weight percent of styrene.

(3) Polydienes such as those hydrocarbon polymers prepared by the homopolymerization of conjugated dienes like butadiene, isoprene, cyclic dienes like cyclopentadiene and their hydrocarbons and particularly $C_1$ to $C_3$ alkyl substituted dienes.

(4) Copolymers prepared by copolymerizing major amounts of from 50 to 98 weight percent, e.g. 60 to 80 weight percent, of a $C_4$ to $C_8$ cyclic or straight chain diene such as butadiene, isoprene, cyclopentadiene, hexadiene and the like with minor amounts of from 2 to 40 weight percent of a $C_2$ to $C_6$ monoolefin like ethylene, propylene, diisobutylene, isobutylene, pentene and the like.

(5) Natural rubber and natural rubber latexes such as those natural elastomeric products derived from the latex of the Hevea and Ficus species. These products are characterized by a high level of unsaturation, rubbery like characteristics and commonly have Wijs iodine numbers of above 200, such as from 200 to 400 or even higher.

These copolymers and homopolymers described above may be copolymerized further with minor amounts, such as from 1 to 30 weight percent, of organic polymerizable monomers or other polymerizable polymers containing one or more vinyl, vinylene, or vinylidene groups such as vinyl aromatics like styrene, divinyl benzene; vinyl cyanides like acrylonitrile, ethacrylonitrile; vinyl esters like the vinyl esters of short chain fatty acids, e.g. vinyl acetate, long chain fatty alcohol esters of acrylic acid and $C_1$ to $C_3$ alkyl substituted acrylic acid; halogenated vinyl compounds like vinylidene chloride, vinyl chloride, chloroprene, ethylene dichloride and the like.

The polymer types described above with the exception of the butyl rubber are commonly referred to as high unsaturation polymers having at least 30 mole percent of unsaturation such as from 50 to 99 mole percent unsaturation.

Unsaturated polymers and particularly those polymers described above can be reacted with the desired metal carbonyl either in bulk or in solution. In order to assure a rapid reaction rate and intimate contact of the metal carbonyl with the polymer by mixing or agitation during the course of the reaction, it is preferred that the polymer be dissolved in an inert organic solvent. Those polymers having molecular weights of below 50,000 normally have viscosity low enough to permit the bulk polymer to be used. Those polymers of higher molecular weight and especially those above 100,000 usually require solvation to obtain suitable handling and mixing characteristics. These polymers may then be used in solvents at varying proportions, while very high molecular weight polymers such as above 200,000 are commonly employed in solutions of not more than 20 weight or 10 weight percent such as from 1 to 6 weight percent.

It is preferred that very low concentrations of polymer in solvent be used, in the preparation of modulating fluids, that is, less than 1 gram/100 ml. of solvent. A preferred range is 1/16 to 1/2 wt. percent of polymer.

Suitable solvents to be employed in effecting solvation include, but are not limited to, dioxane, aliphatic and aromatic hydrocarbons like benzene, toluene, xylene, hexane, heptane, petroleum naphtha, cyclohexane, and the like, ethers such as tetrahydrofuran, 1,2-dimethoxyethane, bis(2-methoxyethyl)ether and the like; ketones like acetone, acetylacetone, methylethyl ketone, methylisobutyl ketone, cyclohexanone and the like; carbon disulfide and mixtures thereof.

The process of U.S. Patent 3,278,441 is applicable to any unsaturated polymers or elastomers regardless of the method of polymerization employed to obtain the original starting polymer. Thus, the process can be profitably employed with those unsaturated polymers normally prepared by the use of heavy metal-organo metal catalysts such as aluminum alkyl-titanium halide systems, for example, the aluminum-triethyl-titanium tetrahalide system referred to as Ziegler catalysts or with metal alkyl-cobalt salt complex systems, as well as with alkali metal catalysts like alkyl-lithium or lithium metal catalysts or with a Friedel-Crafts catalyst like aluminum chloride, boron trifluoride and the like, as well as with those polymers commonly prepared by organic or inorganic free radical initiators or anionic or cationic emulsion polymerization techniques or any other methods.

Many such processes are described in Preparative Methods of Polymer Chemistry, by W. Sorenson and T. W. Campbell, Interscience Publishers, N.Y. (1961), while many of the polymers such as butyl rubber and GR–S are described in greater detail in Synthetic Rubber by G. S. Whitby, J. Wiley & Sons, Inc., N.Y. (1954).

The metal carbonyls suitable for the purposes of the process of U.S. Patent 3,278,441 include carbonyls of Cr, Mo, Mn, Fe, Co, Ni, Ru, Rh, Os, Ir, especially carbonyls of polyvalent heavy metals and particularly Group VIII transition metal carbonyls of iron, cobalt and nickel and their substituted derivatives, and combinations and mixtures thereof. The carbonyls of iron cobalt and nickel are suitable for use in the magnetic polymers used in this invention. Of particular preference are iron carbonyl compounds due to their availability, relatively low cost, stability and low toxicity characteristics. The metal carbonyl employed can be in monomeric or polymeric form, substituted or unsubstituted, with those stable unsubstituted carbonyls and hydrocarbon substituted carbonyls, especially those containing at least two replaceable carbonyl groups, being of particular significance.

The metal carbonyls can contact the unsaturated polymer in any desired physical form such as a liquid, as with $Fe(CO)_5$; or a gas or sublimate vapor, as with $Fe(CO)_5$; or as a solid, as with $Fe_3(CO)_{12}$ and $Fe_2(CO)_9$; or any combinations thereof. Many carbonyls sublimate, and therefore these carbonyls may initially contact the polymer as a solid and subsequently, depending upon the reaction conditions, sublimate to a vapor during the course of the reaction.

It is preferred that the intermediate metal complex polymer be prepared from iron carbonyl. Other carbonyls in excess can be then added so that an iron carbonyl is at the unsaturated site and other metals such as listed above are "clumped" in groups on the iron carbonyl.

Nonlimiting examples of suitable metal carbonyl compounds include those monomeric, dimeric, trimeric and tetrameric carbonyls having from 4 to 12 carbonyl groups, e.g., 4 to 8 carbonyl groups, wherein the carbonyl groups are bonded directly to the metal such as those unsubstituted metal carbonyls like iron pentacarbonyl, di-iron nonacarbonyl, tri-iron dodecacarbonyl, dicobalt octacarbonyl, tetracobalt dodecacarbonyl, nickel tetracarbonyl and the like.

Suitable substituted metal carbonyls include those carbonyls having one or more substituent groups or electron donating ligands bonded to the metal atom of the carbonyl compound such as hydrocarbon groups like unsaturated hydrocarbons like butadiene, 1,3-octadiene, acetylene, propylene, alicyclic conjugated dienes like cyclopentadiene, cyclooctatetraene, $C_1$ to $C_3$ alkyl substituted cyclopentadiene and the like. Nonlimiting examples of substituted carbonyls include 1,3-butadiene-iron tricarbonyl, cyclooctatetraene-iron tricarbonyl, cyclopentadienyl cobalt dicarbonyl, dicyclopentadienyl di-iron tetracarbonyl, acetylene dicobalt hexacarbonyl and the like, and combinations thereof.

A further class of suitable carbonyl compounds includes the neutral and anionic metal carbonyl hydrides wherein one, two, three, four or more hydrogens, as well as carbon monoxide, are bonded directly to the metal, or a combination of hydrocarbons, carbon monoxide and other ligand substituents are bonded directly to the metal as well as the hydrogen. Suitable transition metal carbonyls include the neutral cobalt tetracarbonyl monohydride $HCo(CO)_4$, the neutral iron tetracarbonyl dihydride $H_2Fe(CO)_4$, the anionic bis iron octacarbonyl monohydride $[HFe_2(CO)_8]^-$, the anionic tris iron undecane carbonyl monohydride $[HFe_3(CO)_{11}]^-$, the anionic iron tetracarbonyl monohydride and the like. Also suitable for the purposes of this invention are the neutral salts of the anionic metal carbonyl hydrides. Suitable basic or neutralizing reagents for reaction with the anionic metal carbonyl hydrides include the alkali, alkaline earth and heavy metal oxides and hydroxides, ammonia, amines, such as fatty acid amines, alkyl amines like ethyl amine, polyamines like alkylene diamines, hydroxy amines, quaternary ammonium hydroxides, and the like. An example of a suitable neutral salt formed by the reaction of an alkyl amine with the anionic metal hydride carbonyl would be $[C_2H_5NH]^+ [HFe_3(CO)_{11}]^-$.

Other nonlimiting examples of mixed metal carbonyl hydrocarbon hydrides include, for example, cyclopentadienyl iron dicarbonyl hydride, butadiene cobalt carbonyl hydride. Other suitable ligands include phosphines like triphenyl phosphine, arsines, amines, halides, isonitriles, cyanides and the like.

Figure 8:
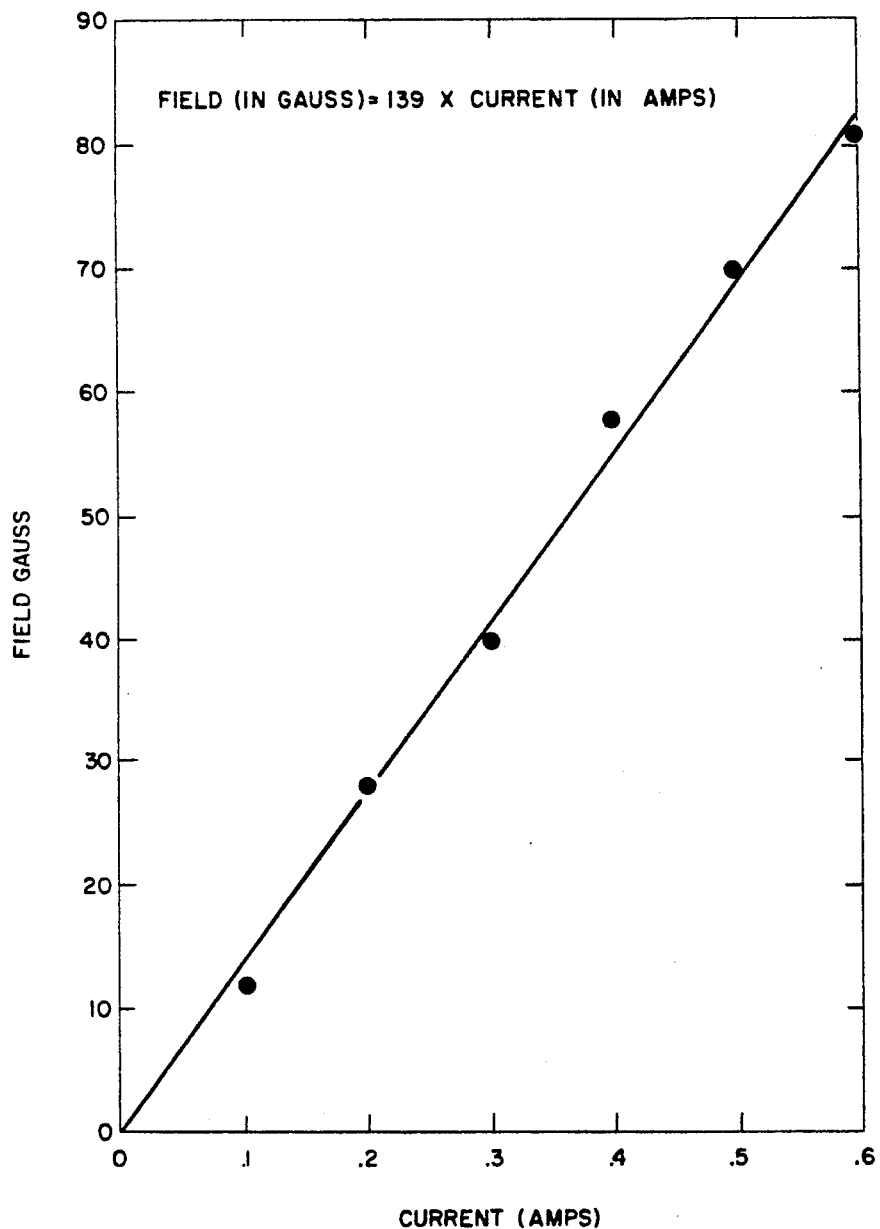

The invention is further illustrated by the following examples. The experimental setup was similar to that schematically illustrated in FIGURES 4 and 5 except that the actual light valve used was that of FIGURE 3 and an indicating meter (voltmeter) was used in place of the speaker 35 of FIGURE 5. All voltages and currents including the permanent magnet were calibrated by means of a Hall effect probe and converted into gausses. This is a calibration technique which relates measurable currents and voltages to the magnetic fields which they produce. The calibration of coil 30 current and amps vs. magnetic field at the center of a sample cell 29 into gausses is shown in FIGURE 8.

The procedure for taking measurements was as follows: The total light with no liquid in the cell was recorded in volts. The same was done with liquid in the cell. The ratio gave the percent transmission. Current was then applied to the coil. The increase in light intensity in volts was obtained. All light densities were recorded relative to the light intensity to the sample liquid at 0 field; that is, a relative light intensity of 2 at some field indicates a 100% increase in light intensity over that going through the liquid at 0 field. The AC measurements were made in a similar manner.

EXAMPLE I.—D.C. MEASUREMENTS

Figure 9:
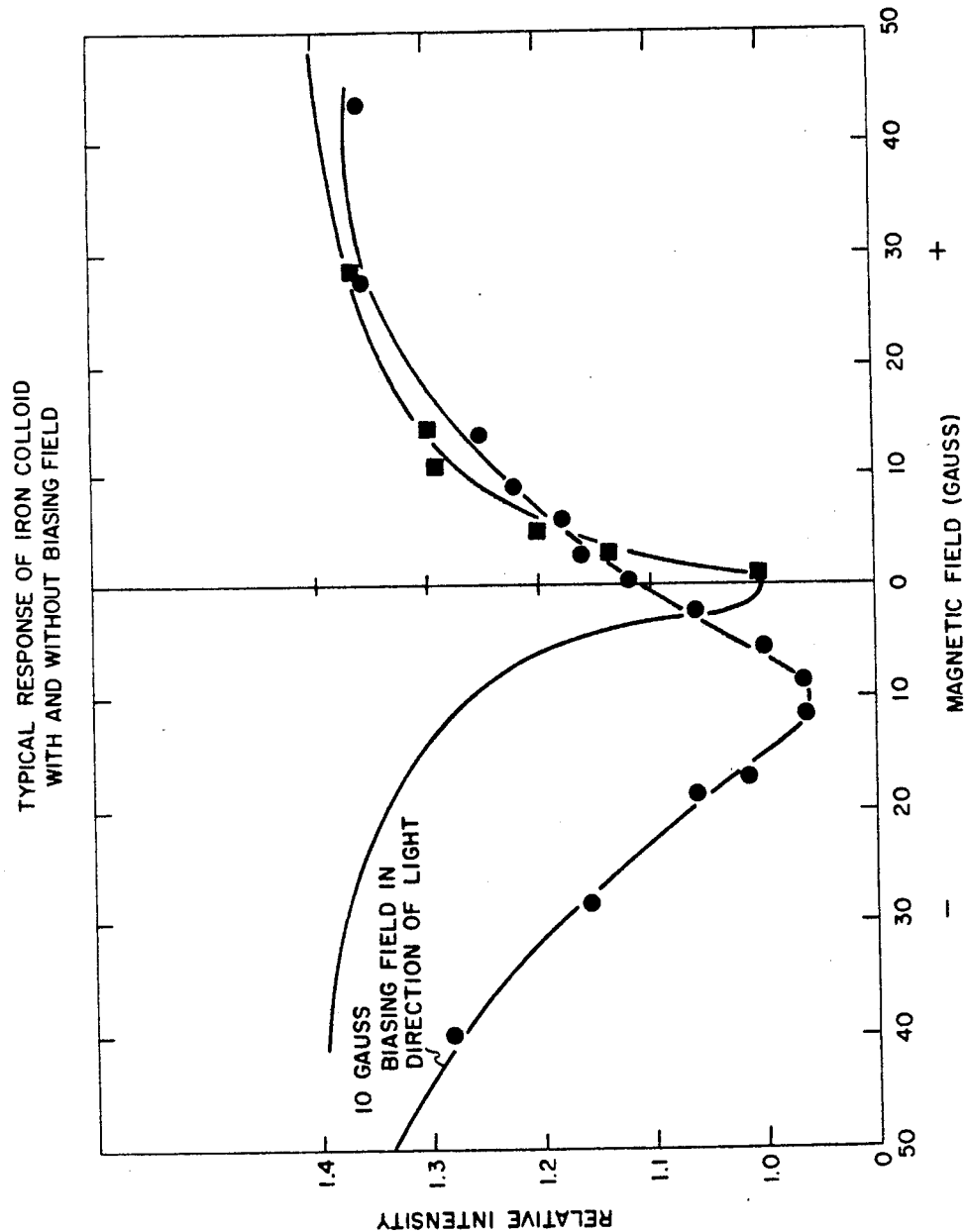

The response of a typical magnetic liquid is shown in FIGURE 9. In this case the magnetic field is parallel to the direction of light. Here and elsewhere in this specification the term "response" refers to changes in light transmission with changes in applied magnetic fields to a magnetic liquid. Also shown in this figure is the effect of a biasing 10 gauss field parallel to the light but in the negative direction. The slight vertical shift is probably due to minor misalignment of fields. The sensitivity is quite remarkable. With this particular liquid, five gauss is sufficient to increase the transmitted light by 20%.

Figure 10:
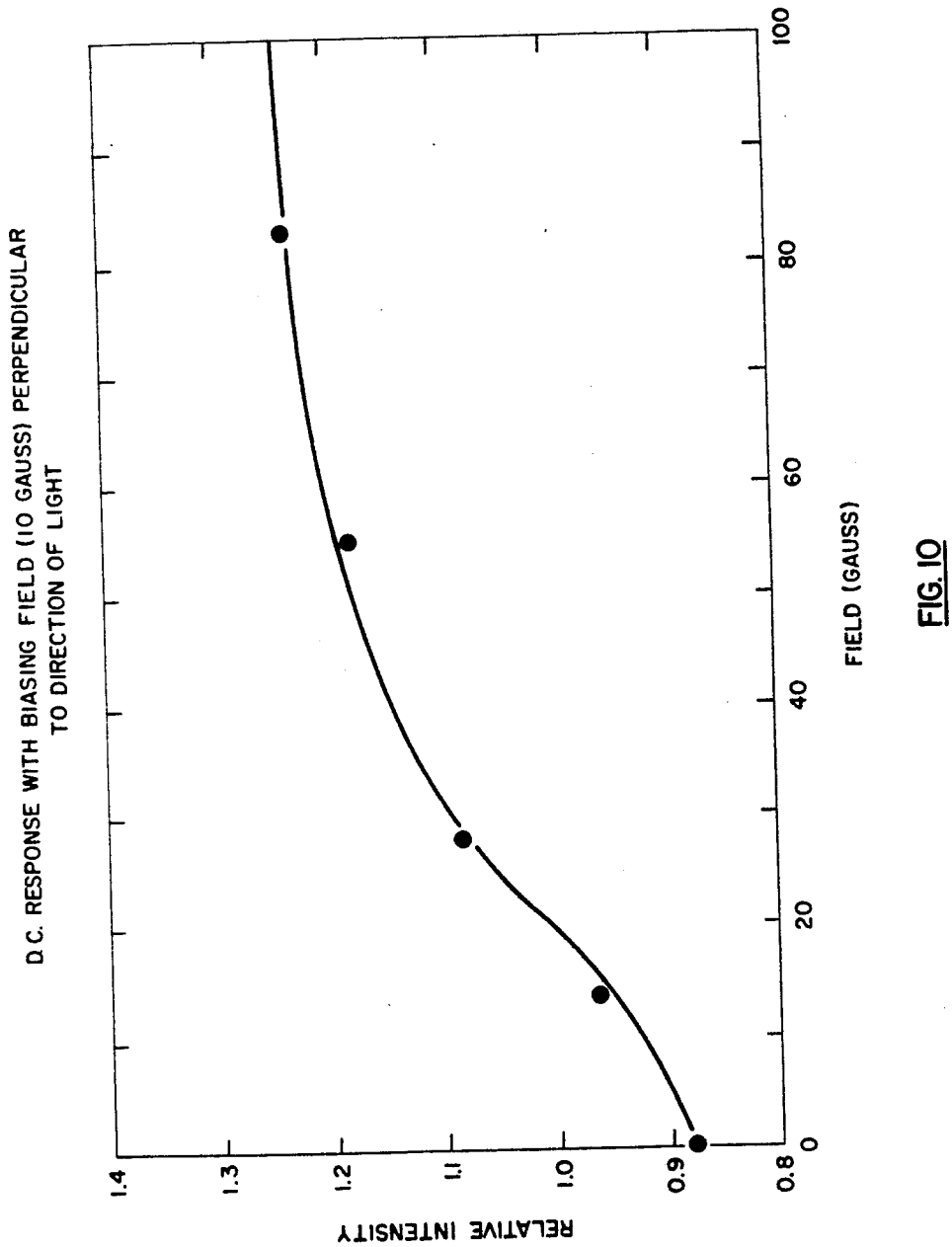

In FIGURE 10 the response is shown when the biasing field is perpendicular to the main field. Since the curve is symmetrical only one-half of the plot is shown. From these figures it is clear that colloidal particles oriented parallel to the light beam enhance the transmitted light while those oriented perpendicular to the light beam attenuate the transmitted light.

Application of a sinusoidal varying field generates only even harmonics of the applied frequency, the principal one being the second harmonic. However, analysis is considerably simplified if one runs in the presence of a D.C. biasing field.

EXAMPLE II.—EFFECT OF COLLOIDAL STRUCTURE

Figure 11:
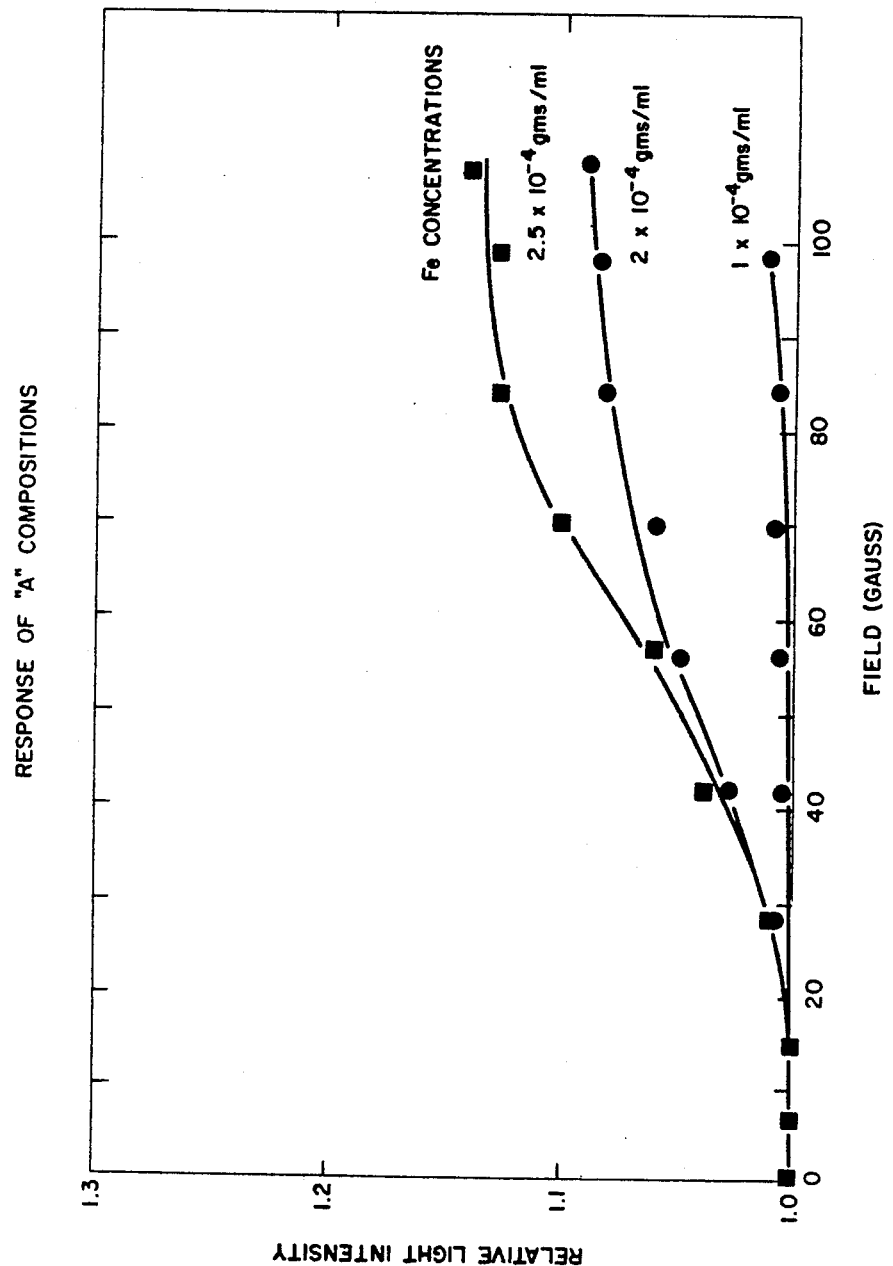
Figure 15:
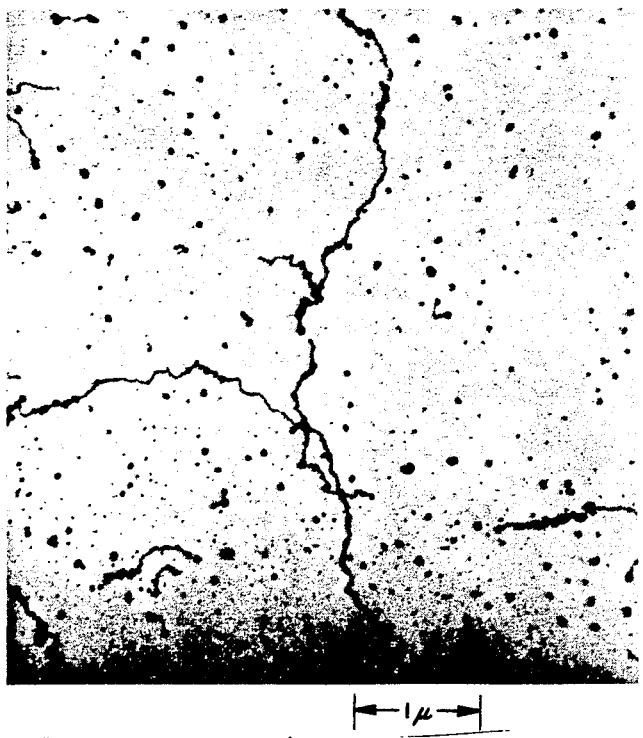
Figure 16:
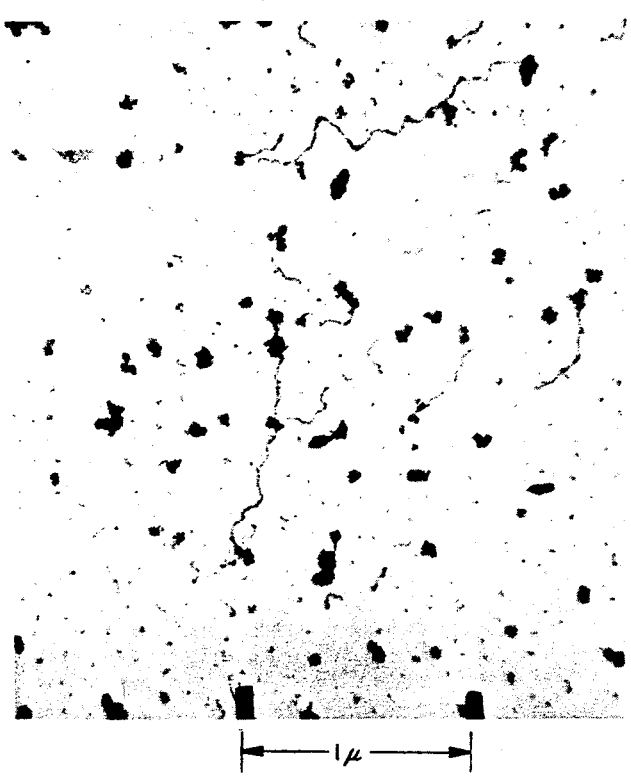

FIGURES 11, 12, and 13 show the response of three different colloidal compositions. Each composition was run at three different iron concentrations. The structures of the colloidal particles in these liquids are shown in the electron micrographs of FIGURES 14, 15 and 16.

The A compositions are characterized as "particle-like"; the B compositions "short chained"; the C compositions "long chained." The coercive forces of each of the three composition types under saturation conditions ($\sim$100 gauss) are as follows: A composition $\sim$0; B composition $\sim$90 oe.; C composition $\sim$300 oe. As one would guess the relative light intensity changes with increasing iron content. However, as FIGURES 11, 12 and 13 show, both the shape and the amplitude of the response curve depend on the structure of the colloidal ferromagnetic polymers.

Coercive force ($H_c$) is defined as the magnetic field at which a magnetic inductor (B) is zero when the material is in a symmetrically and cyclically magnetized condition. In brief, coercive force is a measure of residual magnetism in a magnetic substance after the magnetic field has been removed. The response is then that of the fundamental frequency of the magnetic field. All dynamic data have been obtained under this biased condition. In discussing these results the normal linear second order terminology is used. By second order terminology is meant terminology associated with the vibration equation as follows:

$$m\frac{d^2x}{dt^2} + 2c\frac{dx}{dt} + Rx = 0$$

where $m$ = mass of system
$c$ = clamping and
$R$ = spring rate or elastic constant.

Figure 17:
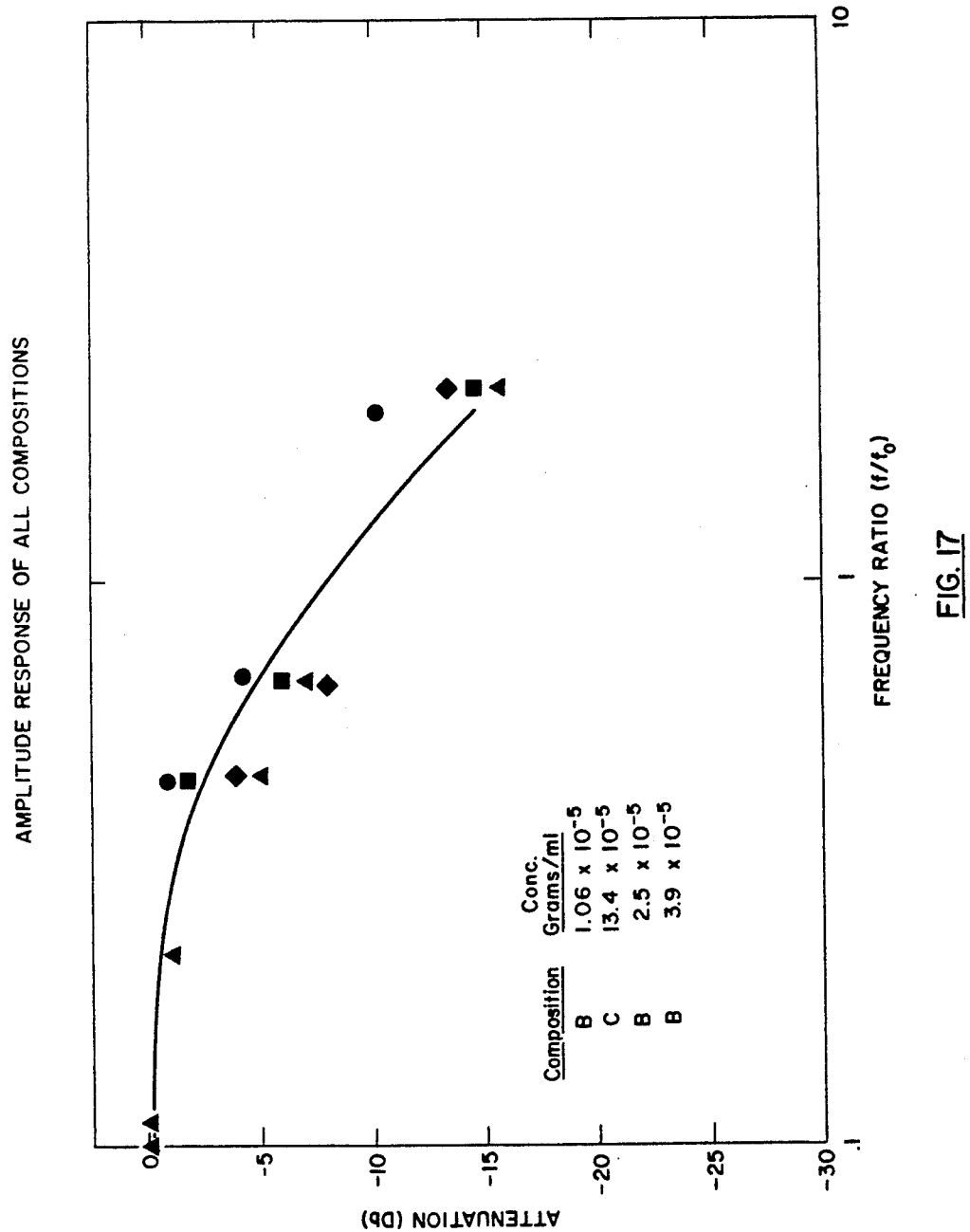

FIGURE 17 shows the frequency response of all the composition types except A compositions from which no measurable readings could be obtained. The exciting magnetic field in all cases was six gauss peak to peak. The attenuation (decrease in light intensity) was calculated as follows:

$$Db = 20 \log \frac{I(\omega)}{I_{13} - I_7}$$

where:

$I(\omega)$ is the intensity at frequency $\omega/2\pi$
$I_{13}$ is the D.C. intensity of the light at 13 gauss [1]
$I_7$ is the D.C. intensity of the light at 7 gauss [1]

[1] The A.C. field of 6 gauss (peak to peak) is run in the presence of the parallel D.C. 10 gauss biasing field hence the field oscillates between 7 gauss and 13 gauss. $\omega_0$ was obtained from FIGURE 18.

Example IV

The phase between the current through the coil (i.e. the magnetic field) and the light intensity was plotted and is shown in FIGURE 18. In all cases the light intensity lags the magnetic field. As with the amplitude measurements, it would appear that all the data (B compositions at three different concentrations and C compositions at one concentration) fall on a single curve. At 90 c.p.s. the light intensity and the magnetic field are 90° out of phase. Ninety c.p.s. were designated as the undamped natural resonant frequency of the magnetic particles of the system and phase vs. $f/f_0$ ($f_0$ = undamped natural frequency) was plotted as shown in FIGURE 19. When FIGURES 17 and 19 are examined it appears that the dynamics in all the systems studied appear to be the same. Moreover, carrying out the analog with linear analysis a bit further, the system seems to be just about critically damped.

Example V

Particle geometry is important for two reasons. One is related to how the particle interacts with the electromagnetic radiation (i.e., the light) and the other depends on the response of the particle to magnetic field. The intensity of transmitted light (at zero magnetic field) as a function of metal content for the three composition types discussed above was plotted and is shown in FIGURE 20. If it were to be expected that the maximum scattering (i.e., the minimum transmissibility) occurs with particles approximately the size of the light wave, it is reasonable to assume that the B compositions have the greatest number of particles in this size range. Thus, the B compositions show the greatest effect as demonstrated by FIGURES 11, 12 and 13. Moreover, it would be expected on this basis that C compositions at longer wavelengths would show the strongest effect. However, as indicated above, the exact mechanism of the light modulation caused by these magnetic polymers is not understood and it is not possible to precisely define the reasons for the differences resulting from the use of magnetic liquids containing particles of varying sizes.

As far as the relationship between magnetic field and geometry is concerned, one can see by comparing the initial slopes in FIGURES 10, 11 and 12 with the electron micrographs of FIGURES 7, 14, 15 and 16 that orientation with the magnetic field is easiest for the longest chain particles.

Example VI

A solution of 0.75 g. of styrene-butadiene rubber having a viscosity-average molecular weight of 300,000 Staudinger in 150 ml. of xylene was mixed with 36 g. of iron pentacarbonyl in a standard 4-neck 500 ml. flask equipped with reflux condenser, nitrogen inlet, thermometer, and mechanical stirrer. The flask was placed in an oil bath kept at 130° C. (the flask) directly over and touching a one-inch Teflon-coated Alnico magnet of the type frequently used for stirring reaction which generated a magnetic field at its surface of 300 oersteds. The mixture was stirred mechanically under a nitrogen atmosphere for 64 hours, then cooled and decanted. This yielded a homogeneous black liquid which had a low coercive force.

The black liquid obtained was then diluted with a solvent mixture comprising 5 vol. percent of dioxane and 95 vol. percent of chloroform to obtain a light modulation liquid containing about $10^{-5}$ grams of iron per cubic centimeter of solvent.

This light modulating liquid was then employed in the apparatus of the invention using the light valve of FIGURE 21. The light source used was an ordinary flashlight and both the valve and receiver were powered by size C flashlight batteries.

Figure 6:
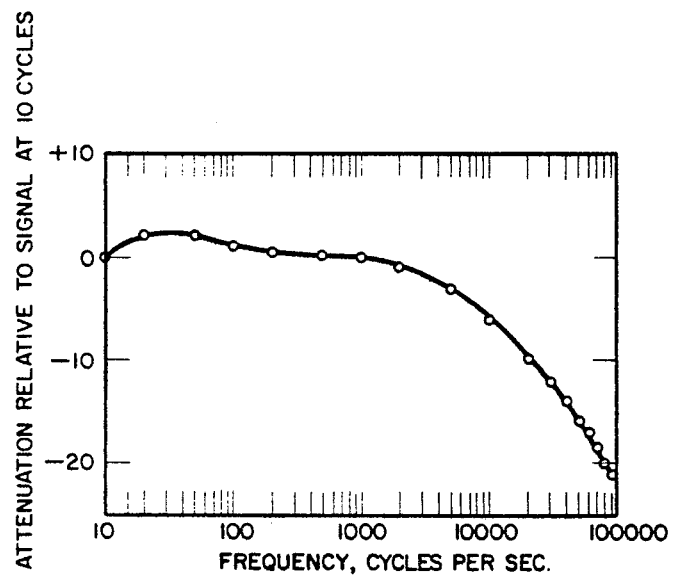
FIGURE 6 is a plot of frequency attenuation showing the range of frequency modulation for one of the more preferred colloidal solutions of the invention.

The frequency response of the magnetic liquid of this example is shown graphically in FIGURE 6. It can be seen from FIGURE 6 that frequency ranges up to 100,000 cycles per second can be handled by this light modulating liquid.

Example VII

A 10 gauss biasing field was applied to the magnetic light modulating liquid of Example VI. The following results were obtained showing the effect of using polarized light. The direction of polarization is designated by E.

| | Response (Volts from Phototube) 10 Gauss Exciting Field | | | |
|---|---|---|---|---|
| | D.C. | 100 c.p.s. | 1,000 c.p.s. | 10,000 c.p.s. |
| No polarization: | | | | |
| Beam \|\| to biasing mag. field | 1.1 | 0.325 | 0.190 | 0.060 |
| Beam 45° to biasing mag. field | 0.25 | 0.500 | 0.300 | 0.064 |
| E ⊥ to beam | 0.6 | 0.2 | 0.115 | 0.038 |
| Beam \|\| to biasing mag. field | | | | |
| E ⊥ to beam | | | | |
| Beam 45° to biasing mag. field | 0.35 | 0.275 | 0.150 | 0.040 |
| E 45° to biasing mag. field | | | | |
| E ⊥ to beam | | | | |
| Beam 45° to biasing mag. field | 0.1 | 0.365 | 0.210 | 0.048 |
| E 45° to biasing mag. field | | | | |

These data indicate that the geometric effects are not simple geometric effects at all. Indeed the pertinent geometry seems to be that between the magnetic field and the electric vector of the light beam.

\|\| Means parallel.
⊥ Means perpendicular.

Example VIII

Modulation experiments were run using a blue, green, and red filter with the modulation fluid of Example VI and the apparatus of FIGURE 21. The results, as shown below, indicate that this phenomenon is independent of the wave length of light.

| | Blue Filter | Green Filter | Red Filter |
|---|---|---|---|
| Percent Modulation [1] | 5.5 | 5.7 | 5.3 |
| Percent Frequency Response [2] | 13.3 | 13.3 | 13.2 |

[1] Percent modulation is defined here as the ratio of the light variation at 100 cycles per second to the intensity of the transmitted light.
[2] Percent frequency response is defined as the ratio of the amplitude at 10,000 cycles per second to the amplitude at 100 cycles per second.

Examples I to V show the properties of magnetic polymer solutions prepared according to the process described in U.S. Patent 3,278,441 where the protective polar solvent dioxane is used in the preparation with the organic solvent. The black liquid obtained is then diluted with chloroform.

Examples VI–VIII show the properties of magnetic polymer solutions where the protective polar solvent is omitted in the preparation of the magnetic polymer and only an organic solvent is used. In these particular examples the resulting black fluid was diluted as described above to obtain the liquid containing $10^{-5}$ grams of iron per cc. of solvent.

In general, the resulting black fluid from the reaction is diluted with a solvent comprising 1 to 10 vol. percent of protective solvent, which is defined above, preferably dioxane, and 99 to 90 vol. percent of another diluting solvent, preferably chloroform but can be an organic solvent as described above. The resulting solution of magnetic polymer in solvent will have about $10^{-6}$ to $10^{-1}$, preferably $10^{-5}$ to $10^{-2}$ and especially preferably $10^{-5}$ to $10^{-3}$ grams of metal such as iron per cubic centimeter of solvent.

A typical preparation of magnetic liquid which in greatly diluted form was used in Examples I to VI is as follows: Ten grams of cis 1-4 polybutadiene having a viscosity-average molecular weight of about 200,000 were dissolved in 500 cc. of xylene and 50 cc. of dioxane. Thirty cubic centimeters of iron pentacarbonyl were added to this solution; and after four hours reflux at about 135° C., another 30 cc. increment was added followed by a third increment of 30 cc. after four more hours. The reaction mixture was then refluxed for an additional 48 hours after the addition of the third increment. During the entire reaction the reaction mixture was stirred with a magnetic stirrer having a surface magnetic field of about 400 oersteds.

The reaction mixture was then diluted in carbon tetrachloride to obtain an iron concentration of about $3.5 \times 10^{-5}$ grams of iron per cc. of solution.

It should be noted that generally the preparation of the magnetic liquid in the absence of the protective polar solvent such as dioxane produces magnetic liquids capable of a higher frequency response than when protective solvent is used. This characteristic is amplified by the further use of a polar solvent preferably dioxane with another solvent, e.g. carbon tetrachloride to dilute the reaction product to obtain the desired metal concentration per cc. The proportions of dioxane with carbon tetrachloride in the diluting solvent are about .5 to 20, preferably 1 to 10 of the former to 99.5 to 80 preferably 99 to 90 vol. percent of the latter.

Other working examples show the preparation of magnetic polymers which can be used in the valves of the invention are given in said U.S. Patent 3,278,441 which has been incorporated herein by reference. The examples and description given herein will be sufficient for one skilled in the art to construct an operative valve.

Although the invention has been described with some degree of particularity, it will be understood that numerous variations in details and construction are contemplated and are within the scope of the invention as claimed in the following claims.

What is claimed is:

1. An optical radiation valve for controlling the transmission of optical radiation passing therethrough comprising in combination:
   (a) container means having means for passing optical radiation into and out of said container, said container being substantially impermeable to magnetic flux,
   (b) a liquid colloidal solution held within said container means, at least a portion of said solution being located in the path of said optical radiation and comprising a major proportion of a solvent and magnetic metallo-polymeric, ferromagnetic particles which are polymeric backbones containing $10^{-6}$ to $10^{-1}$ grams of magnetic metal per cc. of solvent in the form of clumps, wherein said magnetic metal is selected from the group consisting of iron, cobalt and nickel, and which clumps are chemically bonded to Group VIII transition metal carbonyl groups on said polymeric backbones, the combination of said metal clumps and carbonyl substituted polymer being resistant to separation and settlement to the bottom of the colloidal solution, said solvent being substantially permeable to said optical radiation and said solution having the property of responding to an applied magnetic field to vary the intensity of light transmission therethrough from a light source,
   (c) a first coil means connected to a source of EMF engaging said container means wherein current passing through said coil creates a magnetic field within said solution and wherein variations in the strength of said magnetic field proportionately alter the amount of light transmitted through said solution.

2. A valve according to claim 1 which also contains a second coil means connected to a second source of EMF and positioned with respect to said solution so as to create a steady magnetic field within said solution having a magnetic flux direction variable with respect to the path of said optical radiation through said liquid when current passes through said second coil wherein the field produced from said second coil means provides a bias for creating increased linearity in the range of zero field from said first coil.

3. The optical radiation valve of claim 1 wherein said magnetic metallo-polymeric, ferromagnetic particles are formed from the reaction under nonoxidizing conditions at a temperature of from 30° to 150° C. of an ethylenically unsaturated hydrocarbon polymer solution with a carbonyl compound selected from the group consisting of iron carbonyl, nickel carbonyl, and cobalt carbonyl, for a time of about 4 to 120 hours, the metal carbonyl compound being present in the reaction at a concentration between about 2 to 55 moles of iron carbonyl per mole of ethylenical unsaturation in the polymer.

4. A valve according to claim 1 wherein said polymeric backbone is polybutadiene having a viscosity-average molecular weight of 1000 to 1,000,000 and said solvent comprises carbon tetrachloride.

5. A valve according to claim 1 wherein said polymeric backbone is polybutadiene having a viscosity-average molecular weight of 1000 to 1,000,000 and said solvent comprises a major portion of carbon tetrachloride and a minor portion of dioxane.

6. An optical radiation valve for controlling the transmission of optical radiation passing therethrough comprising in combination:
   (a) container means substantially impermeable to magnetic flux, having means for passing optical radiation into and out of said container,
   (b) a liquid held within said container means, at least a portion of said liquid being located in the path of said optical radiation and comprising a major proportion of a solvent and magnetic metallo-polymeric, ferromagnetic particles which are polymeric backbones containing $10^{-6}$ to $10^{-1}$ grams of magnetic metal per cc. of solvent in the form of clumps, wherein said magnetic metal is selected from the group consisting of iron, cobalt and nickel, and which clumps are chemically bonded to Group VIII transition metal carbonyl groups on said polymeric backbones, the combination of said metal clumps and carbonyl substituted polymer being resistant to separation and settlement to the bottom of the liquid, said solvent being substantially permeable to said optical radiation and said solution having the property of responding to an applied magnetic field to vary the intensity of light transmission therethrough from a light source,
   (c) a first coil means connected to a source of EMF engaging said container means wherein current passing through said coil creates a magnetic field within said solution and wherein variations in the strength of said magnetic field proportionately alter the amount of light transmitted through said solution,
   (d) a second coil means connected to a second source of EMF for creating a steady magnetic flux within said liquid, said flux direction being variable with respect to the direction of the path of optical radiation through said liquid, and wherein the field produced from said second means provides a bias for creating increased linearity in the range of zero field from said first coil.

7. A valve according to claim 6 wherein said polymeric backbone is polybutadiene having a viscosity-average molecular weight of 1000 to 1,000,000 and said solvent comprises carbon tetrachloride.

8. A valve according to claim 6 wherein said magnetic metallo-polymeric ferromagnetic particles are prepared by the reaction under nonoxidizing conditions at a temperature of from 30° to 150° C. of an ethylenically unsaturated hydrocarbon polymer solution with a carbonyl compound selected from the group consisting of iron, nickel, and cobalt carbonyls for a time of about 4 to 120 hours, the metal carbonyl compound being present in the reaction at a concentration between about 2 to 55 moles of metal carbonyl per mole of ethylenical, unsaturated unsaturation in the hydrocarbon polymer.

9. An optical valve apparatus according to claim 6 wherein said container means is spherical in shape, said first coil means defining a circle on the perimeter of said container means and the axis of said circle coinciding with the path of optical radiation through said container means, and said second coil means comprises a circular sleeve means adapted to hold a coil of conductive wire, a coil of conductive wire wound on said sleeve means, the interior of said sleeve means circumscribing said spherical container and said sleeve means being adapted to rotate around said spherical container.

10. A valve according to claim 9 wherein said unsaturated polymer is polybutadiene having a viscosity-average molecular weight of 1000 to 1,000,000 and said solvent comprises carbon tetrachloride.

11. A valve according to claim 10 wherein said solvent comprises a mixture of 99.5 to 80 vol. percent of carbon tetrachloride and 0.5 to 20 vol. percent of dioxane.

References Cited

UNITED STATES PATENTS

| | | | |
|---|---|---|---|
| 1,955,923 | 4/1934 | Land | 88—61 |
| 1,963,496 | 6/1934 | Land | 88—61 |
| 2,964,793 | 12/1960 | Blume | 264—24 |
| 2,999,275 | 9/1961 | Blume | 264—108 |
| 3,015,858 | 1/1962 | Hendricks | 264—108 |
| 3,121,169 | 2/1964 | Benton | 88—61 |
| 3,150,313 | 9/1964 | Dehmelt | 88—61 |

JEWELL H. PEDERSEN, *Primary Examiner.*

DAVID H. RUBIN, *Examiner.*

L. ORLOFF, E. S. BAUER, *Assistant Examiners.*